US008883865B2

(12) United States Patent
DiFrancesco et al.

(10) Patent No.: US 8,883,865 B2
(45) Date of Patent: Nov. 11, 2014

(54) CERIUM-CONTAINING NANOPARTICLES

(75) Inventors: Albert Gary DiFrancesco, Rochester, NY (US); Richard K. Hailstone, North Chili, NY (US); Kenneth J. Reed, Rochester, NY (US); Gary R. Prok, Rush, NY (US)

(73) Assignee: Cerion Technology, Inc., Rochester, NY (US)

(*) Notice: Subject to any disclaimer, the term of this patent is extended or adjusted under 35 U.S.C. 154(b) by 261 days.

(21) Appl. No.: 12/779,602

(22) Filed: May 13, 2010

(65) Prior Publication Data

US 2010/0242342 A1 Sep. 30, 2010

Related U.S. Application Data

(63) Continuation-in-part of application No. PCT/US2007/077545, filed on Sep. 4, 2007, and a continuation-in-part of application No. PCT/US2008/087133, filed on Dec. 17, 2008.

(60) Provisional application No. 60/824,514, filed on Sep. 5, 2006, provisional application No. 60/911,159, filed on Apr. 11, 2007, provisional application No. 60/938,314, filed on May 16, 2007.

(51) Int. Cl.
| | |
|---|---|
| *C01F 17/00* | (2006.01) |
| *C01G 25/00* | (2006.01) |
| *B01J 13/00* | (2006.01) |
| *C01G 55/00* | (2006.01) |
| *C10L 1/10* | (2006.01) |
| *C01G 49/00* | (2006.01) |
| *C01G 25/02* | (2006.01) |
| *C10L 10/02* | (2006.01) |
| *B82Y 30/00* | (2011.01) |
| *C01G 49/02* | (2006.01) |
| *C10L 1/188* | (2006.01) |
| *C10L 1/12* | (2006.01) |

(52) U.S. Cl.
CPC ............ *C01G 25/00* (2013.01); *C10L 2250/06* (2013.01); *C01P 2004/52* (2013.01); *C01P 2002/30* (2013.01); *C01P 2002/72* (2013.01); *C01P 2002/52* (2013.01); *B01J 13/0034* (2013.01); *C01G 55/00* (2013.01); *C10L 1/10* (2013.01); *C01P 2004/64* (2013.01); *C01G 49/009* (2013.01); *C10L 1/1881* (2013.01); *C01G 25/02* (2013.01); *C10L 10/02* (2013.01); *C01F 17/00* (2013.01); *C10L 2230/22* (2013.01); *B01J 13/0047* (2013.01); *C01F 17/0043* (2013.01); *B82Y 30/00* (2013.01); *C01P 2006/90* (2013.01); *C01P 2004/51* (2013.01); *C10L 2200/0222* (2013.01); *C01G 49/02* (2013.01); *C01L 2200/0245* (2013.01); *C01G 49/0054* (2013.01); *C10L 2200/024* (2013.01); *C01P 2004/04* (2013.01); *C10L 1/1233* (2013.01)

USPC ................ 516/88; 516/89; 516/90; 423/263; 423/275

(58) Field of Classification Search
USPC .......................... 516/34, 88–90; 423/263, 275
See application file for complete search history.

(56) References Cited

U.S. PATENT DOCUMENTS

| | | | |
|---|---|---|---|
| 1,592,713 | A | 7/1926 | Bendixen |
| 2,965,678 | A | 12/1960 | Sundberg et al. |
| 2,965,994 | A | 12/1960 | Sullivan |
| 3,002,826 | A | 10/1961 | Norris |
| 3,951,934 | A | 4/1976 | Ohshima et al. |
| 3,964,994 | A | 6/1976 | Kelly |
| 4,061,473 | A | 12/1977 | Norris |
| 4,231,893 | A | 11/1980 | Woodhead |
| 4,294,586 | A | 10/1981 | Cox |
| 4,359,969 | A | 11/1982 | Mellovist et al. |
| 4,389,220 | A | 6/1983 | Kracklauer |
| 4,545,923 | A * | 10/1985 | Gradeff et al. .................. 516/33 |

(Continued)

FOREIGN PATENT DOCUMENTS

| | | |
|---|---|---|
| CA | 1201128 A1 | 2/1986 |
| CA | 2536276 A1 | 3/2005 |

(Continued)

OTHER PUBLICATIONS

Reddy et al., "Surfactant-Controlled and Microwave-Assisted Synthesis of Highly Active $Ce_xZr_{1-x}O_2$ Nano-Oxides for CO Oxidation" Catalysis Letters, (2008), vol. 126, No. 1-2, pp. 125-133.

Notification Concerning Transmittal of International Preliminary Report on Patentability (Forms PCT/IB/326 and PCT/IB/373) and the Written Opinion of the Searching Authority (Form PCT/ISA/237) issued in the corresponding International Application No. PCT/US2008/087133 dated Jun. 30, 2011.

**DiFrancesco, Albert Gary, et al., U.S. Appl. No. 13/140,648, entitled "Fuel Additive Containing Lattice Engineered Cerium Dioxide Nanoparticles," filed in the U.S. Patent and Trademark Office on Jun. 17, 2011.

(Continued)

*Primary Examiner* — Steven Bos
(74) *Attorney, Agent, or Firm* — Ratnerprestia

(57) ABSTRACT

A process for making cerium-containing oxide nanoparticles includes providing an aqueous reaction mixture containing a source of cerous ion, optionally a source of one or more metal ions (M) other than cerium, a source of hydroxide ion, at least one monoether carboxylic acid nanoparticle stabilizer wherein the molar ratio of said monoether carboxylic acid nanoparticle stabilizers to total metal ions is greater than 0.2, and an oxidant at an initial temperature in the range of about 20° C. to about 95° C. Temperature conditions are provided effective to enable oxidation of cerous ion to ceric ion, thereby forming a product dispersion of cerium-containing oxide nanoparticles, optionally containing one or more metal ions (M), $Ce_{1-x}M_xO_{2-\delta}$, wherein "x" has a value from about 0.0 to about 0.95. The nanoparticles may have a mean hydrodynamic diameter from about 1 nm to about 50 nm, and a geometric diameter of less than about 45 nm.

17 Claims, 13 Drawing Sheets

(56) References Cited

U.S. PATENT DOCUMENTS

| | | |
|---|---|---|
| 4,599,201 A | 7/1986 | Gradeff et al. |
| 4,661,321 A | 4/1987 | Byrd et al. |
| 4,744,796 A | 5/1988 | Hazbun et al. |
| 4,786,325 A | 11/1988 | Melard et al. |
| 5,004,478 A | 4/1991 | Vogel et al. |
| 5,017,352 A | 5/1991 | Chane-Ching et al. |
| 5,097,090 A | 3/1992 | Beck |
| 5,105,772 A | 4/1992 | Olsson et al. |
| 5,248,744 A | 9/1993 | Cramm et al. |
| 5,344,588 A | 9/1994 | Chane-Ching |
| 5,385,648 A | 1/1995 | Sugishima et al. |
| 5,389,352 A | 2/1995 | Wang |
| 5,405,417 A | 4/1995 | Cunningham |
| 5,449,387 A | 9/1995 | Hawkins et al. |
| 5,520,710 A | 5/1996 | Olah |
| 5,552,133 A | 9/1996 | Lambert et al. |
| 5,712,218 A | 1/1998 | Chopin et al. |
| 5,759,917 A | 6/1998 | Grover et al. |
| 5,906,664 A | 5/1999 | Basu et al. |
| 5,910,466 A | 6/1999 | Yamashita et al. |
| 5,938,837 A | 8/1999 | Hanawa et al. |
| 6,093,223 A | 7/2000 | Lemaire et al. |
| 6,133,194 A | 10/2000 | Cuif et al. |
| 6,136,048 A | 10/2000 | Birchem et al. |
| 6,158,397 A | 12/2000 | Peters et al. |
| 6,210,451 B1 | 4/2001 | Chopin et al. |
| 6,271,269 B1 | 8/2001 | Chane-Ching et al. |
| 6,305,626 B1 | 10/2001 | Korstvedt |
| 6,362,314 B2 | 3/2002 | Akkara et al. |
| 6,368,366 B1 | 4/2002 | Langer et al. |
| 6,383,237 B1 | 5/2002 | Langer et al. |
| 6,391,995 B2 | 5/2002 | Murugan et al. |
| 6,413,489 B1 | 7/2002 | Ying et al. |
| 6,422,736 B1 | 7/2002 | Antoniades et al. |
| 6,509,319 B1 | 1/2003 | Raad et al. |
| 6,627,720 B2 | 9/2003 | Campbell et al. |
| 6,634,576 B2 | 10/2003 | Verhoff et al. |
| 6,645,262 B1 | 11/2003 | Sanduja et al. |
| 6,649,156 B1 | 11/2003 | Chane-Ching |
| 6,723,138 B2 | 4/2004 | Nickel et al. |
| 6,725,653 B2 | 4/2004 | Brown et al. |
| 6,745,961 B2 | 6/2004 | Korstvedt |
| 6,752,979 B1 | 6/2004 | Talbot et al. |
| 6,869,584 B2 | 3/2005 | Ying et al. |
| 6,892,531 B2 | 5/2005 | Rim |
| 6,897,270 B2 | 5/2005 | Ozawa et al. |
| 6,962,681 B2 | 11/2005 | Maganas et al. |
| 7,008,965 B2 | 3/2006 | Chane-Ching |
| 7,025,943 B2 | 4/2006 | Zhou et al. |
| 7,063,729 B2 | 6/2006 | Valentine et al. |
| 7,169,196 B2 | 1/2007 | Wakefield |
| 7,189,768 B2 | 3/2007 | Baran, Jr. et al. |
| 7,195,653 B2 | 3/2007 | Hazarika et al. |
| 7,384,888 B2 | 6/2008 | Kuno |
| 7,419,516 B1 | 9/2008 | Seal et al. |
| 7,709,411 B2 | 5/2010 | Zhou et al. |
| 7,803,201 B2 | 9/2010 | Zhou et al. |
| 7,939,040 B2 | 5/2011 | Larcher et al. |
| 2002/0095859 A1 | 7/2002 | Hicks et al. |
| 2002/0110519 A1 | 8/2002 | Ying et al. |
| 2002/0177311 A1 | 11/2002 | Schumacher et al. |
| 2003/0148235 A1 | 8/2003 | Valentine et al. |
| 2003/0154646 A1 | 8/2003 | Hazarika et al. |
| 2003/0162843 A1 | 8/2003 | Chane-Ching |
| 2003/0182846 A1 | 10/2003 | Nelson et al. |
| 2003/0182848 A1 | 10/2003 | Collier et al. |
| 2003/0215378 A1 | 11/2003 | Zhou et al. |
| 2003/0221362 A1 | 12/2003 | Collier et al. |
| 2004/0029978 A1 | 2/2004 | Chane-Ching |
| 2004/0035045 A1 | 2/2004 | Caprotti et al. |
| 2004/0137239 A1 | 7/2004 | Klos |
| 2004/0241070 A1 | 12/2004 | Noh et al. |
| 2005/0005506 A1 | 1/2005 | Henly |
| 2005/0031517 A1 | 2/2005 | Chan |
| 2005/0044778 A1 | 3/2005 | Orr |
| 2005/0060929 A1 | 3/2005 | Caprotti et al. |
| 2005/0066571 A1 | 3/2005 | Wakefield |
| 2005/0152832 A1 | 7/2005 | Ying et al. |
| 2005/0165139 A1 | 7/2005 | Kawakami et al. |
| 2005/0227864 A1 | 10/2005 | Sutorik et al. |
| 2006/0000140 A1 | 1/2006 | Caprotti et al. |
| 2006/0005465 A1 | 1/2006 | Blanchard et al. |
| 2006/0027484 A1 | 2/2006 | Leck et al. |
| 2006/0057048 A1 | 3/2006 | Chan et al. |
| 2006/0083694 A1 | 4/2006 | Kodas et al. |
| 2006/0185644 A1 | 8/2006 | Hashimoto et al. |
| 2006/0254130 A1 | 11/2006 | Scattergood |
| 2007/0224092 A1 | 9/2007 | Miyairi et al. |
| 2008/0009410 A1 | 1/2008 | Okamoto et al. |
| 2008/0161213 A1 | 7/2008 | Jao et al. |
| 2009/0215614 A1 | 8/2009 | Chane-Ching |
| 2010/0088949 A1 | 4/2010 | Reed |
| 2010/0135937 A1 | 6/2010 | O'Brien et al. |
| 2010/0152077 A1* | 6/2010 | Allston et al. ............... 508/165 |
| 2010/0199547 A1 | 8/2010 | Reed |
| 2011/0056123 A1 | 3/2011 | DiFrancesco et al. |

FOREIGN PATENT DOCUMENTS

| | | |
|---|---|---|
| EP | 0208580 | 1/1987 |
| EP | 0 475 620 A2 | 3/1992 |
| EP | 1842591 A1 | 10/2007 |
| FR | 2 789 601 A1 | 8/2000 |
| FR | 2885308 A1 | 5/2005 |
| GB | 360171 A | 11/1931 |
| JP | S59-001439 A | 1/1984 |
| JP | S59-045925 A | 3/1984 |
| JP | H08-509002 A | 9/1996 |
| JP | H11-501609 A | 2/1999 |
| JP | 2001-507739 A | 6/2001 |
| JP | 2002-537308 A | 11/2002 |
| JP | 2003-520748 A | 7/2003 |
| JP | 2004-502022 A | 1/2004 |
| JP | 2004-507343 A | 3/2004 |
| JP | 2005-508442 A | 3/2005 |
| JP | 2006-040556 A | 2/2006 |
| JP | 2006-506524 A | 2/2006 |
| JP | 2007-051057 A | 3/2007 |
| JP | 2007-512412 A | 5/2007 |
| JP | 2007-283289 A | 11/2007 |
| JP | 2001-524918 A | 10/2008 |
| JP | 2008-538349 A | 10/2008 |
| JP | 2008-273781 A | 11/2008 |
| WO | WO 98/18884 A2 | 5/1998 |
| WO | WO 98/45212 A1 | 10/1998 |
| WO | WO 02/00812 A2 | 1/2002 |
| WO | WO 02/46336 A2 | 6/2002 |
| WO | WO 02/090260 A1 | 11/2002 |
| WO | 2008030815 | 8/2004 |
| WO | WO 2004/065529 A1 | 8/2004 |
| WO | WO 2004/104141 A2 | 12/2004 |
| WO | 2005012465 | 2/2005 |
| WO | 2008002323 | 1/2008 |
| WO | WO 2008/030815 A2 | 3/2008 |

OTHER PUBLICATIONS

**Reed, Kenneth J., et al., U.S. Appl. No. 61/311,416, entitled "Structured Catalytic Nanoparticles and Method of Preparation," filed in the U.S. Patent and Trademark Office on Mar. 8, 2010.
**Alston, Thomas D., et al., U.S. Appl. No. 12/549,776, entitled "Process for Solvent Shifting a Nanoparticle Dispersion," filed in the U.S. Patent and Trademark Office on Aug. 28, 2009.
International Search Report for PCT/US2007/77535, issued by the ISA/US, mailed Jan. 29, 2008.
Written Opinion of the ISA for PCT/US2007/77535, issued by the ISA/US, mailed Jan. 29, 2008.
International Preliminary Examination Report for PCT/US2007/77535, issued by the IPEA/US, completed Oct. 22, 2008.
International Search Report for PCT/US2007/77543, issued by the ISA/US, mailed Jan. 29, 2008.
Written Opinion of the ISA for PCT/US2007/77543, issued by the ISA/US, mailed Jan. 29, 2008.

(56) References Cited

OTHER PUBLICATIONS

International Search Report for PCT/US2007/77545, issued by the ISA/US, mailed Oct. 30, 2008.
Written Opinion of the ISA for PCT/US2007/77545, issued by the ISA/US, mailed Oct. 30, 2008.
Notification of Transmittal of the International Search Report and the Written Opinion of the International Searching Authority (Form PCT/ISA/220), International Search Report (Form PCT/ISA/210) and Written Opinion (Form PCT/ISA/237) issued in the International Application No. PCT/US2011/000429, May 5, 2011, 14 pages.
Notification of Transmittal of the International Search Report and the Written Opinion of the International Searching Authority (Form PCT/ISA/220), International Search Report (Form PCT/ISA/210) and Written Opinion (Form PCT/ISA/237) issued in the International Application No. PCT/US2011/000858, Oct. 24, 2011.
EP Extended (Supplementary) Search Report issued in EP 07814661.0-1270 /2074201 PCT/US2007/077543, mailed Aug. 16, 2011, EPO, The Hague, NL.
EP Extended (Supplementary) European Search Report issued in EP 07814656-1270 / 2066767 PCT US2007/077535, Nov. 4, 2011, EPO, The Hague, NL.
Cerium: A Guide to Its Role in Chemical Technology, 1992, cover pg/p. 11, Library of Congress Catalog Card No. 92-93444, USA.
Trovarelli, Alessandro, "Catalysis by Ceria and Related Materials," *Catalytic Science Series*—vol. 2, 2002, cover page/pp. 37-46, Imperial College Press, London, England.
Sathyamurthy, Srivatsan, et al., "Reverse micellar synthesis of cerium oxide nanoparticles," *Nanotechnology*, 2005, pp. 1960-1964, vol. 16, IOP Publishing Ltd., UK.
Patil, S., et al., "Synthesis of nanocrystalline ceria particles for high temperature oxidation resistant coating," *Journal of Nanoparticle Research*, 2002, pp. 433-438, vol. 4, Kluwer Academic Publishers, NL.
Pang, Yong-Xin, et al., "Aluminium oxide nanoparticles prepared by water-in-oil microemulsions," *Journal of Materials Chemistry*, 2002, pp. 3699-3704, vol. 12, The Royal Society of Chemistry, UK.
Zhang, Feng, et al., "Ceria nanoparticles: Size, size distribution, and shape," *Journal of Applied Physics*, Apr. 15, 2004, pp. 4319-4326, vol. 95, No. 8, American Institute of Physics, USA.
Zhang, Feng, et al., "Cerium oxide nanoparticles: Size-selective formation and structure analysis," *Applied Physics Letters*, Jan. 7, 2002, pp. 127-129, vol. 80, No. 1, American Institute of Physics, USA.
Tsunekawa, S., et al., "Structural Study of Monosize $CeO_{2-x}$ Nano-Particles," *NanoStructural Materials*, 1999, pp. 141-147, vol. 11, No. 1, Acta Metallurgica Inc., USA.
Born, C., et al., "Reduction of Soot Emission at a DI Diesel Engine by Additional Injection of Hydrogen Peroxide During Combustion," *International Fall Fuels and Lubricants Meeting and Exposition*, San Francisco, California, Oct. 19-22, 1998, SAE Technical Paper Series, No.982676, PA, USA.
"Evaluation of Human Health Risk from Cerium Added to Diesel Fuel," *HEI Communication 9*, Aug. 2001, 64 pages (entire publication), Health Effects Institute, MA, USA.
"Development of Reference Doses and Reference Concentrations for Lanthanides," Prepared for the Bureau of Land Management National Applied Resource Sciences Center, Nov. 11, 1999, 52 pages (entire publication), Toxicology Excellence for Risk Assessment, USA.
Chen, Junping, et al., "Rare earth nanoparticles prevent retinal degeneration induced by intracellular peroxides," *nature nanotechnology*, Nov. 2006, pp. 142-150, Nature Publishing.Group, www.nature.com/naturenanotechnology, http://npg.nature.com/reprintsandpermissions/.
Tarnuzzer, Roy W., et al., "Vacancy Engineered Ceria Nanostructures for Protection from Radiation-Induced Cellular Damage," *Nano Letters*, 2005, pp. 2573-2577, vol. 5, No. 12, American Chemical Society, USA.
"Joint TMC/SAE Fuel Consumption Test Procedure—Type II," SAE.J1321, Oct. 1986, 29 pages, Society of Automotive Engineers, Inc., USA.
Deshpande, Sameer, et al., "Size dependency variation in lattice parameter and valency states in nanocrystalline cerium oxide," *Applied Physics Letters*, 2005, vol. 87, 133113-1, three pages, American Institute of Physics, USA.
Tuller, H.L., et al., "Doped Ceria as a Solid Oxide Electrolyte," *Solid-State Science and Technology*, Feb. 1975, pp. 255-259, vol. 122, No. 2, Journal of the Electrochemical Society, NY, USA.
De Guire, Mark R., et al., "Point defect analysis and microstructural effects in pure and donor-doped ceria," *Solid State Ionics*, 1992, pp. 155-163, vol. 52, Elsevier Science Publishers B.V., NL.
Bera, Parthasarathi, et al., "Studies on $Cu/CeO_2$: A New NO Reduction Catalyst," *Journal of Catalysis*, 1999, pp. 36-44, vol. 186, Academic Press, NY, USA.
Terribile, Daniela, et al., "The preparation of high surface area $CeO_2$-$ZrO_2$ mixed oxides by a surfactant-assisted approach," *Catalysis Today*, 1998, pp. 79-88, vol. 43, Elsevier Science B.V., NL.
Mamontov, E., et al., "Lattice Defects and Oxygen Storage Capacity of Nanocrystalline Ceria and Ceria-Zirconia," *J. Phys. Chem. B*, 2000, pp. 11110-11116, vol. 104, American Chemical Society, USA.
Yang, Zongxian, et al., "Effects of Zr doping on stoichiometric and reduced ceria: A first-principles study," *The Journal of Chemical Physics*, 2006, 224704, 7 pages, vol. 124, American Institute of Physics, USA.
Wang, Ruigang, et al., "Nanoscale Heterogeneity in Ceria Zirconia with Low-Temperature Redox Properties," *J. Phys. Chem. B*, 2006, pp. 18278-18285, vol. 110, American Chemical Society, USA.
Bedrane, Sumeya, et al., "Investigation of the oxygen storage process on ceria- and ceria-zirconia-supported catalysts," *Catalysis Today*, 2002, pp. 401-405, vol. 75, Elsevier Science B.V., NL.
Sarkas, Harry, et al., "Nanocrystalline Mixed Metal Oxides—Novel Oxygen Storage Materials," *NSTI-Nanotech 2004*, 2004, pp. 496-498, vol. 3, CRC Press, USA.
Aneggi, Eleonora, et al., "Promotional effect of rare earths and transition metals in the combustion of diesel soot over $CeO_2$ and $CeO_2$-$ZrO_2$," *Catalysis Today*, 2006, pp. 40-47, vol. 114, Elsevier B.V., NL.
Bera, Parthasarathi, et al., "Structural Investigation of Combustion Synthesized $Cu/CeO_2$ Catalysts by EXAFS and Other Physical Techniques: Formation of a $Ce_{1-x}Cu_xO_{2-\delta}$ Solid Solution," *Chem. Mater.*, 2002, pp. 3591-3601, vol. 14, American Chemical Society, USA.
Wang, Xianqin, et al., "Unusual Physical and Chemical Properties of Cu in $Ce_{1-x}Cu_xO_2$ Oxide," *J. Phys. Chem. B*, 2005, pp. 19595-19603, vol. 109, American Chemical Society, USA.
Perez-Alonso, F.J., "Synergy of $Fe_xCe_{1-x}O_2$ mixed oxides for $N_2O$ decomposition," *Journal of Catalysis*, 2006, pp. 340-346, vol. 239, Elsevier Inc., USA.
Ruisheng, Hu, et al., "Solid-Phase Synthesis of Ce—O, Fe—Ce—O Catalysts and Their Catalytic Activities in Methane Combustion," *Petrochemical Technology*, 2006, pp. 319-323, vol. 35, Issue 4, kong zhi li lun yu ying yong bian ji bu, CN.
Norris, David J., et al., "Doped Nancrystals," *Science*, Mar. 28, 2008, pp. 1776-1779, vol. 319, www.sciencemag.org.
Leubner, Ingo H., "Particle nucleation and growth models," *Current Opinion in Colloid & Interface Science*, 2000, pp. 151-159, vol. 5, Elsevier Science Ltd., USA.
Leubner, Ingo H., "A Balanced Nucleation and Growth Model for Controlled Precipitations," *J. Dispersion Science and Technology*, 2001, pp. 125-138, vol. 22, No. 1, Marcel Dekker, Inc., www.dekker.com.
Leubner, Ingo H., "Balanced Nucleation and Growth Model for Controlled Crystal Size Distribution," *Journal of Dispersion Science and Technology*, 2002, pp. 577-590, vol. 23, No. 4, Marcel Dekker, Inc., www.dekker.com.
Griffith, W.L., et al., Correlating Microemulsion Fuel Composition, Structure, and Combustion Properties, *Oak Ridge National Laboratory document TM-11248*, Jan. 1, 1989, 45 pp., Oak Ridge, TN, US.
Patent Abstracts of Japan Publication H05-155616 dated Jun. 22, 1993.
Patent Abstracts of Japan Publication 2005-139029 dated Jun. 2, 2005.
European Search Report dated Apr. 11, 2013 in corresponding European Application Serial No. 08879024.1.
Examiner's Report dated Mar. 8, 2013 in corresponding Canadian Patent Application, Serial No. 2,662,782.

(56) References Cited

OTHER PUBLICATIONS

Zhang, Feng, "Preparation of discrete nanosize eerie powder," Ceramics International, vol. 30, (2004) pp. 997-1002.
Canadian Office Action for corresponding Canadian Pat. App. No. CA 2,662,769, mailed on Jul. 17, 2013.
Canadian Office Action for corresponding Canadian Pat. App. No. CA 2,662,782 mailed on Mar. 8, 2013.
Canadian Office Action for corresponding Canadian Pat. App. No. CA 2,662,782 mailed on Nov. 25, 2013.
Canadian Office Action for corresponding Canadian Pat. App. No. CA 2,662,765 mailed on Dec. 17, 2013.
Indian Office Action for corresponding Indian Pat. App. No. IN 1203/KOLNP/2009 mailed on Jan. 21, 2014.
Japanese Office Action for corresponding Japanese Pat. App. No. JP 2009-527516, mailed on Dec. 25, 2012.
Japanese Office Action for corresponding Japanese Pat. App. No. JP 2009-527516, mailed on Jul. 23, 2013.
Japanese Office Action for corresponding Japanese Pat. App. No. JP 2011-542092, mailed on Jul. 24, 2013.
Mexican Office Action (English Translation only) for corresponding Mexican Pat. App. No. MX/a/2011/006461, mailed on Jun. 3, 2014.
Australian Patent Examination No. 1 for corresponding Australian Pat. App. No. 2011253488, mailed Dec. 2, 2013.

\* cited by examiner

Table 3

| Ex. | Composition (Method 1) | Oxidant | Stabilizer | Stabilizer/ Total Metals Molar Ratio | Particle Size (DLS) | OSC | Rate Constant | Rate Constant |
|---|---|---|---|---|---|---|---|---|
| 4a | $CeO_2$ Sigma Aldrich | - | - | - | (< 25 nm) | 296 (2) | | |
| 4b | $CeO_{2-\delta}$ | $H_2O_2$ | MAA | 2.35 | 2.2 nm | 349 | | |
| 5 | $Ce_{0.9}Fe_{0.1}O_{2-\delta}$ | $H_2O_2$ | MAA | 2.35 | 2.2 nm | 859 (5) | 2.0 (0.1) | 0.8 (0.1) |
| 6 | $Ce_{0.85}Zr_{0.15}O_{2-\delta}$ | $H_2O_2$ | MAA | 2.35 | 2.4 nm | 592 (3) | | |
| 7a | $Ce_{0.75}Zr_{0.15}Fe_{0.10}O_{2-\delta}$ | $H_2O_2$ | MAA | 2.35 | 2.2 nm | 1122 (3) | 3.1 (0.4) | 0.9 (0.2) |
| 7b | $Ce_{0.70}Zr_{0.15}Fe_{0.15}O_{2-\delta}$ | $H_2O_2$ | MAA | 2.35 | - | 1359 (3) | 5.9 (0.1) | 2.0 (0.2) |
| 7c | $Ce_{0.65}Zr_{0.15}Fe_{0.20}O_{2-\delta}$ | $H_2O_2$ | MAA | 2.35 | - | 1653 (6) | 3.4 (0.4) | 1.1 (0.3) |
| 7d | $Ce_{0.60}Zr_{0.15}Fe_{0.25}O_{2-\delta}$ | $H_2O_2$ | MAA | 2.35 | - | 2013 (1) | 3.1 (0.4) | 1.1 (0.2) |
| 7e | $Ce_{0.55}Zr_{0.15}Fe_{0.30}O_{2-\delta}$ | $H_2O_2$ | MAA | 2.35 | - | 2370 (4) | 2.6 (0.1) | 1.0 (0.1) |
| 7f | $Ce_{0.60}Zr_{0.20}Fe_{0.20}O_{2-\delta}$ | $H_2O_2$ | MAA | 2.35 | - | 1661 (7) | 4.9 (1.3) | 1.2 (0.2) |

*FIG. 6*

CERIUM-CONTAINING NANOPARTICLES

CROSS-REFERENCE TO RELATED APPLICATIONS

This application is a continuation-in-part of PCT/US07/ 077,545, METHOD OF PREPARING CERIUM DIOXIDE NANOPARTICLES, filed Sep. 4, 2007; in the names of Kenneth J. Reed et al., which claims the benefit of priority from: Provisional Application Ser. No. 60/824,514, CERIUM-CONTAINING FUEL ADDITIVE, filed Sep. 5, 2006; Provisional Application Ser. No. 60/911,159, REVERSE MICELLAR FUEL ADDITIVE COMPOSITION, filed Apr. 11, 2007; and Provisional Application Ser. No. 60/938,314, REVERSE MICELLAR FUEL ADDITIVE COMPOSITION, filed May 16, 2007. This application is also a continuation-in-part of PCT/US2008/087133, FUEL ADDITIVE CONTAINING LATTICE ENGINEERED CERIUM DIOXIDE NANOPARTICLES, filed Dec. 17, 2008; in the names of Kenneth J. Reed et al. This application is also related to: U.S. patent application Ser. No. 12/549,776, PROCESS FOR SOLVENT SHIFTING A NANOPARTICLE DISPERSION, filed Aug. 28, 2009. The disclosure of all of these applications is incorporated herein by reference.

FIELD OF THE INVENTION

The present invention relates in general to cerium-containing nanoparticles and, in particular embodiments, to cerium oxide nanoparticles that further contain one or more metals (M) other than cerium, and to a method for preparing such particles. These nanoparticles are useful, in part, as components of fuel additive compositions.

BACKGROUND OF THE INVENTION

Cerium-containing oxide nanoparticles have many current industrial uses, as well as many potential applications in the future. They are well known as important components in solid oxide fuel cells, three-way automotive exhaust catalysts, automotive fuel borne catalysts, and ultra-violet sun blockers, to name just a few. Its utility is often attributed to its solid state redox chemistry, resulting from the relatively facile $Ce^{3+}/Ce^{4+}$ electrochemical conversion. This allows nanoceria, for example, to store oxygen under oxidizing conditions, wherein $Ce^{3+}$ is converted to $Ce^{4+}$, and to release oxygen under reducing conditions, wherein $Ce^{4+}$ is converted to $Ce^{3+}$ and oxygen vacancies are created, a property commonly referred to as its oxygen storage capacity (OSC). As an automotive fuel borne catalyst, the ability of nanoceria to store and release oxygen in a diesel engine combustion chamber, whereby local inhomogeneities in the fuel/oxygen mixture are reduced, is believed to produce a more complete burn, thereby generating more power with reduced soot and toxic gas emissions.

Many of these end use applications benefit directly from the small particle size of nanoceria due to increased surface area and enhanced reactivity. There are many synthetic methods for the production of metal oxides, including aqueous or organic precipitation, hydrothermal precipitation, spray precipitation, chemical vapor deposition, and plasma deposition techniques. Aqueous precipitation methods are particularly favored in cases where high through-put is desired, wherein a relatively large amount of product is to be produced. However, conventional metal oxide precipitation processes typically include the multiple steps of reactant delivery, particle precipitation, isolation, washing, drying, impregnation, calcination (heating to 400-1000° C. for several hours), grinding, milling and particle size classification, among others. Alternatively, direct methods seek to produce a dispersion (suspension) of the final particles directly, thereby avoiding the time, cost and potential contamination inherent in the isolation, drying, calcination, grinding, milling and classification steps. For many end use applications, however, these direct methods present the additional challenge of maintaining dispersion stability (preventing aggregation or clumping of particles) during subsequent washing, handling and storage of the dispersed product particles.

Aqueous precipitation methods for the direct preparation of nanoceria are described in U.S. Pat. No. 5,389,352; U.S. Pat. No. 5,938,837 and U.S. Patent Appl. No. 2007/0215378. The basic precipitation process described in these references involves adding a cerium (III) salt and a base, such as ammonium hydroxide, and converting the cerium (III) salt into a ceria ($CeO_2$) precipitate. In some cases an oxidant, such as hydrogen peroxide ($H_2O_2$) was also included.

Wang, U.S. Pat. No. 5,389,352, describes the reaction of cerous nitrate with ammonia at high temperatures (above 100° C.) in a closed container for 24 hours. These hydrothermal precipitations produce a slurry of ceria, evidence of the instability of the particle dispersions. Alternatively, a room temperature reaction of $H_2O_2$, cerous nitrate and ammonia over a 4 hours period is described as producing a powder with average crystallite size of about 7 nanometers (nm). However, there is no description of the actual agglomerated particle size, as would be revealed by a transmission electron microscopy (TEM) analysis, or a hydrodynamic diameter measurement by a dynamic light scattering technique. There is also no teaching of the use of a stabilizer additive to improve dispersion stability, nor any suggestion of how to reduce the time of the reaction.

Hanawa, U.S. Pat. No. 5,938,837, describes the precipitation of ceria from an aqueous solution based reaction of cerous nitrate and ammonia at a pH range between 5 and 10, preferably between 7 and 9, along with the use of a carefully timed temperature ramp up to 70-100° C. within 10 minutes of initial mixing of the reactants. It is evident that these particle dispersions have very poor stability as a slurry of particles is produced. While a crystallite size of about 20 nm was determined from X-ray Diffraction peak widths and confirmed by TEM analysis, the particles are highly agglomerated as evidence by the TEM image of FIG. 2, which was taken after a deagglomeration step. There is no teaching of the use of an oxidant, nor any suggestion to employ a stabilizer additive to reduce the particle agglomeration or to improve the dispersion stability.

Zhou et al., U.S. Pat. Appl. 2003/0215378, describes the aqueous precipitation of slurries of cerium dioxide resulting from the reaction of cerium nitrate and ammonium hydroxide during which oxygen is bubbled through the reaction mixture. The basic process followed is to form a precipitate, and then to filter and dry the precipitate. While the primary crystallite sizes are quite small (3-100 nm), the particles are substantially aggregated as shown in TEM images taken only after the samples were prepared by ultrasonically dispersing the powder in ethanol. There is no suggestion to employ an oxidant stronger than molecular oxygen. There is no suggestion to employ a stabilizer additive to reduce the particle aggregation or to improve the particle dispersion stability.

Cuif et al., U.S. Pat. No. 6,133,194, describes the use of anionic surfactants, non-ionic surfactants, polyethylene glycols, carboxylic acids, and carboxylate salts as additives in a conventional aqueous precipitation or co-precipitation process involving cerium solutions, zirconium solutions, base and optionally an oxidizing agent, at a pH preferably greater than about 7, wherein after the reaction stage, mixed hydroxides, such as $(Ce,Zr)(OH)_4$, are precipitated, the solid precipitate is recovered and separated from the mother liquor by conventional solid/liquid separation techniques such as decantation, drying, filtration and/or centrifugation, then washed, calcined at a minimum temperature of 400° C., a temperature high enough to ensure removal of carbonaceous remnants from the oxide, hydroxide or carbonate. Many additives are disclosed for addition to the reaction mixture from which the mixed hydroxides are precipitated, isolated, washed and calcined. Many alkoxylated compounds are disclosed for use in the washing or impregnation, preferably in the form of a wet cake, followed by calcination. There is no disclosure of monoether carboxylic acids, or salts thereof, as an additive. Furthermore there is no suggestion to use any of the additives disclosed therein in a direct preparation method of making metal oxide, hydroxide or carbonate particles with a goal of reducing particle size or maintaining or improving particle dispersion stability.

Poncelet et al., FR 2885308, describe the use of polyether carboxylic acids (2-(2-methoxyethoxy) acetic acid (MEAA) and 2-(2-(2-methoxyethoxy)ethoxy) acetic acid (MEEAA)) and the monoether carboxylic acid (3-methoxypropionic acid (MPA)) as an additive in the preparation of method of Cuif et al. (U.S. Pat. No. 6,133,194) for cerium oxide, zirconium oxide or a mixed oxide of cerium and zirconium. Example 3 shows that use of a specific monoether carboxylic acid, 3-methoxypropionic acid (MPA), in the preparation of cerium oxide Ammonium hydroxide is added to a solution containing a mixture of MPA and cerous nitrate in the molar ratio of 0.16 MPA to cerium ion. The resulting product was a suspension (dispersion) of cerium oxide particles. The size of the aggregates formed is reported as having a hydrodynamic diameter of 50-60 nm. Furthermore, the specification clearly states that the alkoxy carboxylic acid/metallic oxide molar ratio is between 0.01 and 0.2. Preferably the alkoxy carboxylic acid/metallic oxide ratio is between 0.05 and 0.15. There is no suggestion in Poncelet et al. (FR 2885308) to employ an oxidant additive such as hydrogen peroxide.

There is a need to provide small nanoparticles of metal oxides, such as cerium oxides and homogeneously doped cerium oxides, and to provide robust, cost-effective methods for their preparation. To date, the smallest aggregate size achieved using a monoether carboxylic acid stabilizer in an aqueous preparation of cerium oxide is only 50-60 nm. There is a need to provide aqueous dispersions of metal oxide nanoparticles, such as cerium oxides and homogeneously doped cerium oxides, with excellent dispersion stability, particularly when the polarity of the solvent is reduced to improve the compatibility of the dispersion with a hydrocarbon diluent/fuel, such as kerosene, diesel fuel or biodiesel fuel. There is a need to provide fuel additives with improved fuel efficiency, reduced toxic gas and particulate emissions, and reduced engine conditioning time before the benefits of the fuel additive are realized.

SUMMARY OF THE INVENTION

The present invention is directed to a process for making cerium-containing oxide nanoparticles, optionally containing one or more metal ions (M) other than cerium, that comprises: (a) providing an aqueous reaction mixture comprising a source of cerous ion and, optionally a source of one or more metal ions (M) other than cerium, wherein said sources of metal ions are introduced concurrently, a source of hydroxide ion, at least one monoether carboxylic acid nanoparticle stabilizer, wherein the molar ratio of the monoether carboxylic acid nanoparticle stabilizers to total metal ions is greater than 0.2, and an oxidant at an initial temperature in the range of about 20° C. to about 95° C.; and (b) providing temperature conditions effective to enable oxidation of cerous ion to ceric ion, thereby forming a product dispersion comprising nanoparticles of cerium oxide, $CeO_{2-\delta}$, or doped cerium oxide, $Ce_{1-x}M_xO_{2-\delta}$, wherein "x" has a value from about 0.001 to about 0.95, and $\delta$ has a value from about 0.0 to about 0.5. The cerium oxide nanoparticles thus obtained may have a cubic fluorite structure, a mean hydrodynamic diameter in the range of about 1 nm to about 50 nm, and a geometric diameter in the range from about 1 nm about 45 nm.

In particular embodiments, the monoether carboxylic acid is methoxyacetic acid, and the cerium-containing oxide nanoparticles contain one or more metal ions (M) other than cerium, $Ce_{1-x}M_xO_{2-\delta}$, wherein "x" has a value from about 0.001 to about 0.95, and $\delta$ has a value from about 0.0 to about 0.5. In particular embodiments, the metal ions M are zirconium, iron, palladium, or combinations thereof.

BRIEF DESCRIPTION OF THE DRAWINGS

FIGS. 4A and 4B are respectively, a TEM image and a particle size-frequency analysis by TEM of isothermally prepared $CeO_{2-\delta}$ nanoparticles containing Zr and Fe, prepared as described in Example 7a. FIG. 4C are X-ray diffraction spectra of isothermally prepared $CeO_{2-\delta}$ nanoparticles and of isothermally prepared $CeO_{2-\delta}$ nanoparticles containing Zr and Fe, prepared as described in Example 7a.

FIG. 6 includes Table 3 containing particle size, OSC and rate results for homogeneously doped cerium oxide nanoparticle variations.

DETAILED DESCRIPTION OF THE INVENTION

Figure 1A:
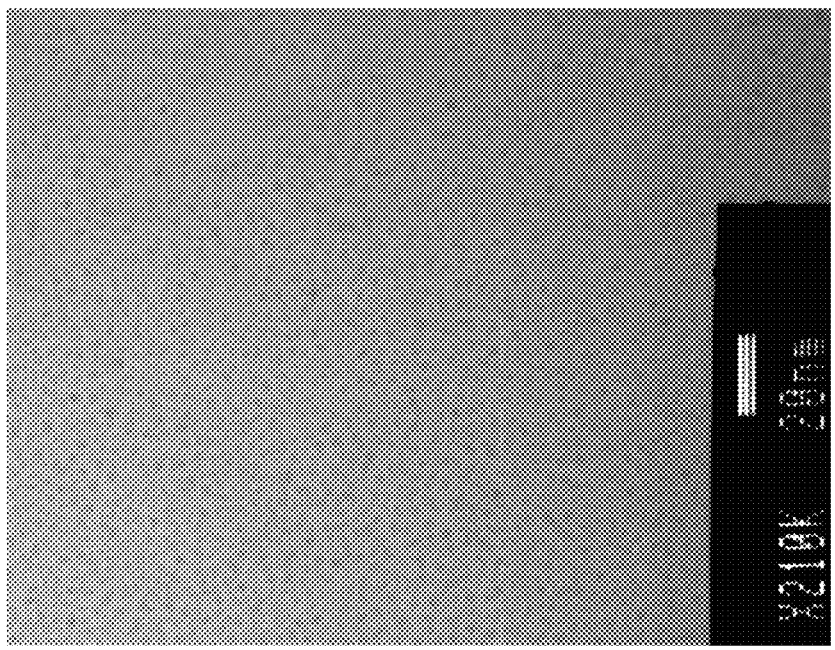
FIGS. 1A and 1B are, respectively, a TEM image and a particle size-frequency analysis by TEM of isothermally precipitated $CeO_{2-\delta}$ nanoparticles, prepared by a triple jet process as described in Example 4.

It is to be understood that elements not specifically shown or described may take various forms well known to those skilled in the art. The invention is defined by the claims.

In this disclosure, the term "metal" in referring to elements of the Periodic Table includes all elements other than those of the following atomic numbers: 1-2, 5-10, 14-18, 33-36, 52-54, 85 and 86.

The term "transition metal" is understood to encompass the 40 chemical elements of atomic number 21 to 30, 39 to 48, 72 to 80, which are included in Periods 4, 5, 6, respectively, of the Periodic Table.

The term "rare earth metal" is understood to encompass the 15 chemical elements of atomic number 57 to 71, which are included in Period 5 of the Periodic Table.

The term "alkali metal" is understood to encompass the 6 chemical elements forming Group 1 of the Periodic Table, those of atomic number 3, 11, 19, 37, 55, and 87.

The term "alkaline earth metal" is understood to encompass the 6 chemical elements forming Group 2 of the Periodic Table, those of atomic number 4, 12, 20, 38, 56, and 88.

Nanoparticles are particles having a mean diameter of less than about 100 nm. The size of the resulting cerium-containing oxide particles can be determined by dynamic light scattering, a measurement technique for determining the hydrodynamic diameter of the particles. The hydrodynamic diameter is typically slightly larger than the geometric diameter of the particle because it includes both the native particle size and the solvation shell surrounding the particle. When a beam of light passes through a colloidal dispersion, the particles or droplets scatter some of the light in all directions. When the particles are very small compared with the wavelength of the light, the intensity of the scattered light is uniform in all directions (Rayleigh scattering). If the light is coherent and monochromatic as, for example, from a laser, it is possible to observe time-dependent fluctuations in the scattered intensity, using a suitable detector such as a photomultiplier capable of operating in photon counting mode. These fluctuations arise from the fact that the particles are small enough to undergo random thermal Brownian motion, and the distance between them is therefore constantly varying. Constructive and destructive interference of light scattered by neighboring particles within the illuminated zone gives rise to the intensity fluctuation at the detector plane, which, because it arises from particle motion, contains information about this motion. Analysis of the time dependence of the intensity fluctuation can therefore yield the diffusion coefficient of the particles from which, via the Stokes Einstein equation and the known viscosity of the medium, the hydrodynamic radius or diameter of the particles can be calculated. Alternatively, the geometric diameter of a nanoparticle may be determined by analysis of TEM images.

Although nominally described as "cerium oxide" or "cerium dioxide", it is understood by one skilled in the chemical arts, that the actual oxidic anions present may comprise oxide anions or hydroxide anions, or mixtures thereof, such as hydrated oxide phases (e.g. oxyhydroxide). In addition, compositions of matter comprised of solid solutions of multivalent cations are often termed non-stoichiometric solids. Thus, for oxide phases comprised of metal cations of multiple oxidation states, it is understood that the total amount of oxidic anions present will be determined by the specific amounts of the various oxidation states of the metal cations present (e.g. $Ce^{3+}$ and $Ce^{4+}$), such that charge neutrality is maintained. For non-stoichiometric phases nominally described as metal dioxides, this is embodied in the chemical formula $MO_{2-\delta}$, wherein the value of $\delta$ (delta) may vary. For cerium oxides, $CeO_{2-\delta}$, the value of $\delta$ (delta) typically ranges from about 0.0 to about 0.5, the former denoting cerium (IV) oxide, $CeO_2$, the latter denoting cerium (III) oxide, $CeO_{1.5}$ (alternatively denoted $Ce_2O_3$).

In one particular embodiment, homogeneously doped cerium dioxide nanoparticles of the invention have a median or mean diameter ranging from 1.5 to 8 nm. In another embodiment, the median or mean diameter ranges from 2 to 4 nm. In still another embodiment, the median or mean diameter ranges from 2 to 3 nm.

The term "doped" particle refers to a particle containing one or more foreign or dopant ions present in concentrations greater than would normally be present as impurities. Generally, and as used herein, a dopant is present in concentrations ranging from about 0.1 percent to about 95 percent. Above 50% substitutional doping, the roles of host and guest ions become transposed. Doping of cerium dioxide with a metal ion may be described in general by the formula $Ce_{1-x}M_xO_{2-\delta}$, wherein x varies from about 0.001 to about 0.95, and $\delta$ varies from about 0.0 to about 0.5 in order to maintain charge neutrality. It is understood that the value of $\delta$ may be less than zero for metal dopant ions with a formal valence state greater than 4+. Combinations of dopant metals are also considered. In particular embodiments, the transition metals are Zr, Fe, and Pd; the rare earth metals are La or Y, or any combination thereof. Doping of cerium dioxide to improve ionic transport, reaction efficiency and other properties is disclosed in, for example, U.S. Pat. Nos. 6,752,979; 6,413,489; 6,869,584; 7,169,196 B2; 7,384,888B2; and U.S. Patent Appl. Publ. No. 2005/0152832. Structured doping of cerium dioxide is described in commonly assigned U.S. Provisional Application Ser. No. 61/311,416, STRUCTURED CATALYTIC NANOPARTICLES AND METHOD OF PREPARATION, filed Mar. 8, 2010. Some alternative terms commonly used in place of "doped" are "substituted", "mixed metal" and "lattice engineered."

The term "homogeneously doped cerium oxide" nanoparticle refers to a nanoparticle prepared by a process wherein the sources of the dopant metal ions and cerium ions are introduced concurrently into the reaction mixture. The sources of the various metal ions may, for example, be comixed into the same metal salt solution, or one or more the various metals may be dissolved in separate solutions and then added simultaneously with the addition of the other metal ions to the reaction mixture, for example, through separate jets. Some alternative terms commonly used in place of "homogeneously doped" are "continuously doped", "uniformly doped," and "unstructured doped".

In accordance with one embodiment of the invention, a method of producing cerium oxide nanoparticles comprises: (a) providing an aqueous reaction mixture comprising a source of cerous ion, a source of hydroxide ion, at least one monoether carboxylic acid nanoparticle stabilizer, wherein the molar ratio of the monoether carboxylic acid nanoparticle stabilizers to total cerium ions is greater than 0.2, and an oxidant at an initial temperature in the range of about 20° C. to about 95° C.; and (b) providing temperature conditions effective to enable oxidation of cerous ion to ceric ion, thereby forming a product dispersion comprising cerium oxide nanoparticles, $CeO_{2-\delta}$. In particular embodiments the cerium oxide nanoparticles thus obtained have a cubic fluorite structure, a mean hydrodynamic diameter in the range of about 1 nm to about 50 nm, and a geometric diameter in the range from about 1 nm to about 45 nm.

In accordance with another embodiment of the invention, a method of producing doped cerium oxide nanoparticles comprises: (a) providing an aqueous reaction mixture comprising a source of cerous ion and a source of one or more metal ions (M) other than cerium, wherein said sources of metal ions are introduced concurrently, a source of hydroxide ion, at least one monoether carboxylic acid nanoparticle stabilizer, wherein the molar ratio of the monoether carboxylic acid nanoparticle stabilizers to total metal ions is greater than 0.2, and an oxidant at an initial temperature in the range of about 20° C. to about 95° C. or about 20° C. to about 100° C.; and (b) providing temperature conditions effective to enable oxidation of cerous ion to ceric ion, thereby forming a product dispersion comprising homogeneously doped cerium oxide nanoparticles, $Ce_{1-x}M_xO_{2-\delta}$, wherein "x" has a value from about 0.001 to about 0.95 or about 0.01 to about 0.95, and $\delta$ has a value from about 0.0 to about 0.5. In particular embodiments the doped cerium oxide nanoparticles thus obtained have a cubic fluorite structure, a mean hydrodynamic diameter in the range of about 1 nm to about 50 nm, and a geometric diameter in the range from about 1 nm to about 45 nm.

Sources of hydroxide ion include alkali metal hydroxides, such as sodium or potassium hydroxide, and ammonium hydroxide. Alternative sources of hydroxide ion include basic solutions of carbonate, bicarbonate or hydroxy carbonate ions. The molar ratio of hydroxide ion to total metal ions can vary widely. In various embodiments the molar ratio of hydroxide to metals ranges from about 1:1 to about 2:1, to as high as about 5:1. In various other embodiments the amount of hydroxide ion is limited to maintain a reaction pH of less than about 7, less than about 5, and less than about 4.5. In another embodiment, the amount of hydroxide is a quantity sufficient to form nanoparticles.

The nanoparticle stabilizers of the invention are monoether carboxylic acids. In one embodiment, the nanoparticle stabilizer is water-soluble and forms weak bonds with the cerium ion. In another embodiment, the nanoparticle stabilizer is a monoether carboxylic acid of formula (I).

$$ROCHR^1CO_2Y \quad (1)$$

In formula (I), R represents a substituted or unsubstituted alkyl group ($C_1$-$C_4$), for example, a methyl group, an ethyl group; or an aromatic group such as a phenyl group. $R^1$ represents hydrogen or a substituent group such as an alkyl group. In formula (1), Y represents H or a counterion such as an alkali metal ion, for example, $Na^+$ or $K^+$. A non-limiting list of monoether carboxylic acids includes: ethoxyacetic acid, methoxyacetic acid, 3-methoxypropionic acid, and combinations thereof. The monoether carboxylic acid stabilizers are present in an amount such that the molar ratio of stabilizer to the total metal ions (or metal oxides) is greater than 0.2. In various other embodiments the molar ratio of stabilizer to the total metal ions (or metal oxides) is greater than 0.25, greater than 0.3, and greater than 0.6. While not wishing to be held to any particular theory, the carboxylic acid group may bind to the nanoparticle surface, while the remainder of the stabilizer (i.e. ether moiety) prevents agglomeration of the particles and the subsequent formation of large clumps of particles.

In a particular embodiment, the cerium oxide or doped cerium oxide nanoparticles are formed in an aqueous environment and combined with one or more nanoparticle stabilizers. In other embodiments, the cerium oxide or doped cerium oxide nanoparticles are formed in the presence of the stabilizer(s), formed at least in part in the presence of the stabilizer(s), or the stabilizer(s) is added shortly after their formation.

In other embodiments the nanoparticles are synthesized in solvents or solvent mixtures that are less polar than water. Regardless of whether the synthesized nanoparticles are made in a hydrophilic or hydrophobic medium, however, dispersions of cerium-containing nanoparticles benefit substantially from a stabilizer additive of the invention in regard to reducing undesirable agglomeration. Additionally, the amount of the stabilizer in the reaction mixture is critical when an oxidant more powerful than ambient air is also present.

In various embodiments, oxidants for use in the invention include compounds more oxidizing than molecular oxygen (or an ambient atmosphere of air). In electrochemical half cell reaction terms, suitable oxidants are compounds with a aqueous half cell reduction potential greater than −0.13 volts relative to a standard hydrogen electrode. In particular embodiments the oxidant is an alkali metal or ammonium perchlorate, chlorate, hypochlorite, or persulfate; ozone, or hydrogen peroxide, or combinations thereof. The amount of oxidant in relation to the amount of metal ions to be oxidized can vary widely. In particular embodiments the molar equivalent amount of oxidant present is equal to or greater than the total molar equivalent amount of metal ions to be oxidized. In specific embodiments, two-electron oxidants, such as hydrogen peroxide, are present in at least one-half the molar concentration of the cerium ion.

In some embodiments the cerium-containing oxide nanoparticles exhibit an X-ray diffraction pattern characteristic of the cubic fluorite structure.

Cerium-containing nanoparticles can be prepared by a variety of techniques known in the art. Some of these synthetic techniques are described in the following publications: U.S. Pat. Nos. 6,271,269; 6,649,156; 7,008,965; U.S. Patent Appl. Publ. Nos. 2004/0029978 (abandoned Dec. 7, 2005); 2006/0005465; U.S. Pat. No. 7,025,943; WO 2008/002223 A2; U.S. Pat. No. 4,231,893; U.S. Patent Appl. Publ. Nos. 2004/0241070; 2005/0031517; U.S. Pat. Nos. 6,413,489; 6,869,584; U.S. Patent Appl. Publ. No. 2005/0152832; U.S. Pat. No. 5,938,837; European Patent Application EP 0208580, published 14 Jan. 1987; U.S. Pat. Nos. 7,419,516; and 6,133,194.

As described above, crystalline cerium dioxide nanoparticles can be prepared by various procedures. In some embodiments, the synthetic routes utilize water as a solvent and yield an aqueous mixture of nanoparticles and one or more salts. For example, cerium dioxide particles can be prepared by reacting the hydrate of cerium (III) nitrate with hydroxide ion from, for example, aqueous ammonium hydroxide, and thereby forming cerium (III) hydroxide, as shown in equation (2a). Cerium hydroxide can be oxidized to cerium (IV) dioxide with an oxidant such as hydrogen peroxide, as shown in equation (2b). The analogous tris hydroxide stoichiometry is shown in equations (3a) and (3b).

$$Ce(NO_3)_3(6H_2O)+2NH_4OH \rightarrow Ce(OH)_2NO_3+ \\ 2NH_4NO_3+6H_2O \quad (2a)$$

$$2Ce(OH)_2NO_3+H_2O_2 \rightarrow 2CeO_2+2HNO_3+2H_2O \quad (2b)$$

$$Ce(NO_3)_3(6H_2O)+3NH_4OH \rightarrow Ce(OH)_3+3NH_4NO_3+ \\ 6H_2O \quad (3a)$$

$$2Ce(OH)_3+H_2O_2 \rightarrow 2CeO_2+4H_2O \quad (3b)$$

Complexes formed with very high base levels, e.g. 5 to 1 ratio of OH to Ce, also provide a route to cerium oxide, albeit at much larger grain sizes if not properly growth-restrained.

In some cases, especially those in which ammonium hydroxide is not present in excess relative to the cerous ion, the species $Ce(OH)_2(NO_3)$ or $(NH_4)_2Ce(NO_3)_5$ may initially be present, subsequently undergoing oxidation to cerium dioxide.

Commonly assigned PCT/US2007/077545, METHOD OF PREPARING CERIUM DIOXIDE NANOPARTICLES, filed Sep. 4, 2007, describes a mixing device that is capable of producing $CeO_2$ nanoparticles down to 1.5 nm, in high yield and in very high suspension densities. The reactor includes inlet ports for adding reactants, a propeller, a shaft, and a motor for mixing. More particularly, in one embodiment, a high shear mixer such as a colloid mill manufactured by Silverson Machines, Inc. is employed to agitate the reaction mixture.

In another embodiment, the present invention provides for a continuous process for producing cerium-containing oxide nanoparticles, optionally containing one or more transition and/or rare earth metal ions, having a mean hydrodynamic diameter of about 1 nm to about 50 nm, wherein the process comprises the steps of combining cerous ion, optionally one or more metal ions other than cerium, an oxidant, at least one monoether carboxylic acid nanoparticle stabilizer, wherein the molar ratio of the monoether carboxylic acid nanoparticle stabilizers to total metal ions is greater than 0.2, and hydroxide ion within a continuous reactor. In a particular embodiment, the cerium-containing oxide nanoparticles produced by a continuous process are crystalline.

When an aqueous preparation is employed, the cerium oxide nanoparticle dispersion is typically purified, wherein the unreacted cerium salts (e.g. nitrate) and waste by-products (e.g. ammonium nitrate) are removed, most conveniently, for example, by diafiltration (transverse flow filtration through a semi-permeable membrane). In order to promote subsequent solvent shifting into less polar media, including non-polar media, it is desirable to reduce the ionic strength to a conductivity of about 5-10 mS/cm or less. Alternatively, the nanoparticles may be purified by other means, for example, by centrifugation. The product dispersion may be diluted or concentrated before, during, or after the purification process.

In another embodiment, a process is provided for forming a homogeneous dispersion containing undoped or homogeneously doped cerium oxide nanoparticles, at least one monoether carboxylic acid nanoparticle stabilizer, a solvent less polar than water, at least one surfactant, and a non-polar medium. In particular embodiments, glycol ether solvents of a polarity intermediate between that of water and those of non-polar hydrocarbons are used to reduce the polarity of the nanoparticle dispersion, as disclosed in commonly assigned U.S. patent application Ser. No. 12/549,776, PROCESS FOR SOLVENT SHIFTING A NANOPARTICLE DISPERSION, filed Aug. 28, 2009. Specific embodiments employ diethylene glycol monomethyl ether, 1-methoxy-2-propanol, or a mixture thereof, as polarity shift solvents. In particular embodiments, the water content of the nanoparticle dispersions are reduced to less than about 10 wt. %, less about 5 wt. %, less than about 2 wt. %, and less than 0.5 wt. %. In particular embodiments, the cerium-containing oxide nanoparticle content of the dispersion is increased (concentrated) to about 35-40 wt. %.

In another embodiment, the undoped or homogeneously doped cerium oxide nanoparticles dispersed in an intermediate polarity medium of low water content, still stabilized in part by the original monoether carboxylic acid stabilizer, and by a glycol ether shift solvent, are subsequently dispersed homogeneously into a higher molecular weight surfactant, such as oleic acid, which in turn is soluble in non-polar hydrocarbon diluents, such as kerosene, which is compatible with most hydrocarbon fuels such as diesel and biodiesel. In one embodiment, the oleic acid also contains a co-surfactant such as 1-hexanol. While not wishing to be held to any particular theory, it is important to realize that this composition of matter is not a reverse micelle water-in-oil emulsion, as there is very little water present; rather, the positive charge on the surface of the cerium nanoparticle has been complexed by the ether oxygen atoms and bound to the oppositely charged carboxylic acid. The higher molecular weight carboxylic acid surfactant (e.g. oleic acid) is present in a chemisorbed or physisorbed state and facilitates the miscibility of the nanoparticle with a non-polar hydrocarbon diluent. In some embodiments, the higher molecular weight surfactants are carboxylic acids with carbon chain lengths less than about 20 carbon atoms but greater than about 8 carbon atoms. In particular embodiments, higher molecular weight surfactants such as linoleic acid, stearic acid, and palmitic acid are used in place of oleic acid.

In another embodiment, a process is provided for combining the homogeneous dispersion containing undoped or homogeneously doped cerium oxide nanoparticles in the higher molecular weight surfactant, with a non-polar hydrocarbon diluent to form a fuel additive concentrate. In various embodiments the non-polar hydrocarbon diluent is a hydrocarbon containing about 6-20 carbon atoms, including, for example, aliphatic hydrocarbons such as hexane, heptane, octane, nonane, decane; inert cycloaliphatic hydrocarbons such as cyclopentane, cyclohexane, or cycloheptane; aromatic hydrocarbons such as benzene, toluene, ethylbenzene, xylenes or liquid naphthenes; kerosene (e.g. KENSOL® K1), naphtha, diesel fuel, biodiesel, gasoline, petroleum distillates, (e.g. SOLVESSO® 100 and SOLVESSO® 150), hydrotreated petroleum distillates (e.g. KENSOL® 48H, KENSOL® 50H) and paraffin oils (e.g. offerings under the ISOPAR® tradename), and mixtures thereof. In particular embodiments, additional glycol ether shift solvent (e.g. diethylene glycol monomethyl ether, 1-methoxy-2-propanol, or a mixture thereof) is added to the fuel additive concentrate such that the total glycol ether content is about 5%, about 10%, about 15%, or about 20% by volume. In one embodiment, when used as a fuel additive, one part of the fuel additive concentrate is combined with at least about 100 parts of the fuel.

Dispersions of undoped or homogeneously doped cerium oxide nanoparticles of the invention can be used in many applications. By way of example, the following publications describe fuel additives containing cerium oxidic compounds: U.S. Pat. Nos. 5,449,387; 7,063,729; 6,210,451; 6,136,048; 6,093,223; 7,195,653 B2; U.S. Patent Appl. Publ. Nos. 2003/0182848; 2003/0221362; 2004/0035045; 2005/0060929; 2006/0000140; International Publ. Nos. WO 2004/065529; and WO 2005/012465.

As is known to those skilled in the chemical arts, cerium oxide or cerium dioxide is widely used as a catalyst in automotive catalytic converters for the elimination of toxic exhaust emission gases and in diesel particulate filters for the reduction of particulate emissions in diesel powered vehicles. Within the catalytic converter or diesel particulate filter, cerium-containing oxide particles can act as a chemically active component, acting to release oxygen in the presence of reductive gases, as well as to remove oxygen by interaction with oxidizing species. The chemical reactivity of a fully oxidized ceria based three-way or fuel borne catalyst can conveniently be measured by following the progress of the reaction:

$$CeO_2 \rightarrow CeO_{2-w} + w/2 O_2$$

The extent to which the reaction gives off oxygen (the number of moles of $O_2$) is called the oxygen storage capacity (OSC) and the rate at which this happens is embodied in the rate constant, k. Alternatively, the OSC of a reduced form of the three-way or fuel borne catalyst can conveniently be measured by following the progress of the reverse reaction. It is understood that high OSC and high k, are associated with higher reactivity catalysts. The undoped and homogeneously doped cerium oxide nanoparticles of the present invention and the processes for making thereof, can be used to form catalysts for these purposes.

Motor oil is used as a lubricant in various kinds of internal combustion engines in automobiles and other vehicles, boats, lawn mowers, trains, airplanes, etc. Engines contain contacting parts that move against each other at high speeds, often for prolonged periods of time. Those moving parts create friction, forming a temporary weld, immobilizing the moving parts. Breaking this temporary weld absorbs otherwise useful power produced by the motor and converts the energy to useless heat. Friction also wears away the contacting surfaces of those parts, which may lead to increased fuel consumption and lower efficiency and degradation of the motor. In one aspect of the invention, a motor oil includes a lubricating oil and undoped or metal-containing, crystalline, homogeneously doped cerium oxide nanoparticles, having a mean diameter of 1.5-10 nm, or a mean diameter of 2-4 nm, or alternatively, a mean diameter of 2-3 nm, and optionally a surface adsorbed stabilizing agent that is delivered as a homogeneous dispersion in a non-polar medium.

Diesel lubricating oil and fuels are essentially free of water (preferably less than 300 parts per million (ppm)) but may be modified by the addition of an undoped or homogeneously doped cerium oxide nanoparticle composition, wherein these compositions have been solvent shifted from their aqueous reaction environment to that of an organic or non-polar medium. In particular embodiments, these undoped or homogeneously doped cerium oxide compositions include nanoparticles having a mean diameter of less than about 6 nm, or less than about 4 nm, or less than about 3 nm, as already described. A diesel engine operated with modified diesel fuel and/or modified lubricating oil provides greater efficiency and may, in particular, provide improved fuel mileage, reduced engine wear or reduced pollution, or a combination of these features.

Metal polishing, also termed buffing, is the process of smoothing metals and alloys and polishing to a bright, smooth mirror-like finish. Metal polishing is often used to enhance cars, motorbikes, antiques, etc. Many medical instruments are also polished to prevent contamination in irregularities in the metal surface. Polishing agents are also used to polish optical elements such as lenses and mirrors to a surface smoothness within a fraction of the wavelength of the light they are to manage. Polishing agents may be used for planarization (rendering the surface smooth at the atomic level) of semiconductor substrates for subsequent processing of integrated circuits. Homogeneous dispersions of uniformly dimensioned undoped or metal-containing homogeneously doped cerium oxide particles in aqueous media of varying acidity/alkalinity, in media of reduced polarity relative to water, or in non-polar media, may be advantageously employed as polishing agents in polishing operations.

The invention is further illustrated by the following examples, which are not intended to limit the invention in any manner.

EXAMPLES

Particle Size Measurement: Hydrodynamic Diameter

Characterization of the particle size of an aqueous dispersion was provided using a Brookhaven 90Plus Particle Size Analyzer (Brookhaven Instruments Corp., Holtzville, N.Y., U.S.A.), which determines the hydrodynamic diameter of the particles by dynamic light scattering (DLS) techniques. Reported sizes are the lognormal number weighted parameter.

Oxygen Storage Capacity Measurement

Aqueous sols of cerium-containing nanoparticles prepared as described herein were heated for 30 minutes in a muffle furnace at 1000° C. to remove the organic stabilizer, then ground to a uniform consistency to remove any effects from mild sintering. These thoroughly dried samples were measured for OSC and the kinetics at which they reached their maximum OSC using thermogravimetric techniques. More specifically, OSC was measured using a TA Instruments Q500 thermo-gravimetric analyzer (TGA). The thoroughly dried/ground samples were then heated in the TGA furnace to 700° C. under air and allowed to stay at that temperature for 15 minutes. The sample was exposed to a reducing environment consisting of 5% $H_2$ in nitrogen for 40 min. Then, the sample was exposed to air for 15 min. This was all completed at 700° C. The weight change was recorded by the TA instrument. The OSC calculation used is: (Final weight under Oxygen–Final weight under $H_2/N_2$)/(32× Sample Weight) and the measured values are reported as μ moles $O_2$/g sample.

In some embodiments, one observes a very fast initial reduction rate (i.e. sample weight loss) in nitrogen gas containing 5% hydrogen, followed by a second slower rate. The accompanying Table 2 contains the Oxygen Storage Capacity (1 sigma reproducibility in parenthesis) and the fast ($k_1$) and slow ($k_2$) rate constants (1 standard deviation in parenthesis) for reduction of various cerium, iron and zirconium containing nanoparticles (all about 2 nm except the Sigma Aldrich control) in a nitrogen gas at 700° C. containing 5% $H_2$. These values have been cross-checked against a second TGA instrument (average 2.6% difference), against gas flow differences (average 1% deviation) and replicate sample preparation at 1000° C. for 30 minutes (average 1.54% deviation).

Background to Examples 1-2: These examples are an attempt to combine two distinct teachings from earlier work, ones taken from Cuif et al., U.S. Pat. No. 6,133,194, and Poncelet et al., FR 2885308. Once more, Cuif et al. (U.S. Pat. No. 6,133,194) describes many additives other than monoether carboxylic acids for use in conventional aqueous precipitation processes for the preparation of cerium oxides, zirconium oxides, cerium/zirconium mixed oxides and cerium/zirconium solid solutions. It is also suggested therein, but not exemplified, that optionally an oxidizing agent can be used, preferably hydrogen peroxide, which can be added to the cerium/zirconium mixture or to the cerium or zirconium salt before the metals are mixed together. It is suggested that the amount of oxidizing agent in relation to the metal salts to be oxidized 1) can vary within wide limits, and 2) is generally greater than a stoichiometric amount, corresponding to an excess. Poncelet et al. (FR 2885308) describes the use of alkoxy carboxylic acids (both monoether carboxylic acids and polyether carboxylic acids) as additives in an aqueous precipitation processes of Cuif et al. (U.S. Pat. No. 6,133, 194), and without the addition of an oxidant, such as hydrogen peroxide, provides a direct process (not requiring the steps of precipitation, isolation and calcination) of obtaining dispersions (colloidal solutions) of cerium oxide particles having aggregates that are much finer and better dispersed than the cerium oxide obtained with either sodium dioctylsulfo-succinate additive or EDTA additive, or without an additive. Poncelet et al. (FR 2885308) clearly specifies that the alkoxy carboxylic acid/metallic oxide molar ratio is between 0.01 and 0.2. It is further specified that preferably the alkoxy carboxylic acid/metallic oxide molar ratio is between 0.05 and 0.15. Example 3 of Poncelet et al. (FR 2885308)

describes the use of a monoether carboxylic acid (3-methoxypropionic acid) in an aqueous synthesis process of Cuif et al. (U.S. Pat. No. 6,133,194) to produce aggregates of cerium oxide particles with a hydrodynamic diameter of 50-60 nm.

Examples 1-2 combine the suggestion of Cuif et al. (U.S. Pat. No. 6,133,194) to use an oxidizing agent, hydrogen peroxide, in a wide range of amounts (herein 0.2, 1.0 and 2.0 times a stoichiometric amount relative to the metals (e.g. cerous ion) available to be oxidized), with the teachings of Poncelet et al. (FR 2885308) that an alkoxy carboxylic acid (e.g. monoether carboxylic acid) additive used in the nanoparticle preparation process of Cuif et al. (U.S. Pat. No. 6,133, 194) must be in an amount such that the alkoxy carboxylic acid/metallic oxide molar ratio is in the range of 0.01 and 0.2, and preferably in the range of 0.05 to 0.15.

Example 1a

Preparation of $CeO_{2-\delta}$ using 0.125 MAA/Total Metals Molar Ratio with 1× Hydrogen Peroxide Oxidant (Comparative)

The procedures of Example 1 of Poncelet et al. (FR 2885308) were repeated, except that an equimolar amount of MAA (methoxyacetic acid) was used in place of MEAA (2-(2-methoxyethoxy)acetic acid), and a stoichiometric amount of hydrogen peroxide ($H_2O_2$) oxidant relative to the amount of cerium salt was added to the cerium salt solution. The molar ratio of MAA to total metals was 0.125. The hydrodynamic diameter of the resulting suspension of cerium oxide particles was 188 nm.

Example 1b

Preparation of $CeO_{2-\delta}$ using 0.125 MAA/Total Metals Molar Ratio with 2× Hydrogen Peroxide Oxidant (Comparative)

The procedures of Example 1a were repeated except that the amount of hydrogen peroxide was increased to 2× a stoichiometric amount relative to the amount of cerium salt. The hydrodynamic diameter of the resulting suspension of cerium oxide particles was 202 nm.

Example 2a

Preparation of $Ce_{0.75}Zr_{0.15}Fe_{0.1}O_{2-\delta}$ using 0.125 MAA/Total Metals Molar Ratio with 0.2× Hydrogen Peroxide Oxidant (Comparative)

The procedures of Examples 1 of Poncelet et al. (FR 2885308) were repeated, except that an equimolar amount of MAA (methoxyacetic acid) was used in place of MEAA (2-(2-methoxyethoxy)acetic acid), and appropriate amounts of $Ce(NO_3)_3 \cdot 6H_2O$, $ZrO(NO_3)_2 \cdot xH_2O$ and $Fe(NO_3)_3 \cdot 9H_2O$ to form $Ce_{0.75}Zr_{0.15}Fe_{0.1}O_{2-\delta}$ were added to the metal salt solution (homogeneous doping). The hydrodynamic diameter of the resulting suspension of cerium-zirconium-iron containing oxide particles was 1110 nm.

Example 2b

Preparation of $Ce_{0.75}Zr_{0.15}Fe_{0.1}O_{2-\delta}$ using 0.125 MAA/Total Metals Molar Ratio with 0.2× Hydrogen Peroxide Oxidant (Comparative)

The procedures of Example 2a were repeated, except that 0.2× a stoichiometric amount of hydrogen peroxide ($H_2O_2$) oxidant relative to the total amount of metal salts was added to the metal salt solution. The hydrodynamic diameter of the resulting suspension of cerium-zirconium-iron containing oxide particles was 1253 nm.

Example 2c

Preparation of $Ce_{0.75}Zr_{0.15}Fe_{0.1}O_{2-\delta}$ using 0.125 MAA/Total Metals Molar Ratio with 1× Hydrogen Peroxide Oxidant (Comparative)

The procedures of Example 2a were repeated, except that a stoichiometric amount of hydrogen peroxide ($H_2O_2$) oxidant relative to the total amount of metal salts was added to the metal salt solution. The hydrodynamic diameter of the resulting suspension of cerium-zirconium-iron containing oxide particles was 698 nm.

Example 2d

Preparation of $Ce_{0.75}Zr_{0.15}Fe_{0.1}O_{2-\delta}$ using 0.125 MAA/Total Metals Molar Ratio with 2× Hydrogen Peroxide Oxidant (Comparative)

The procedures of Example 2a were repeated, except that 2× a stoichiometric amount of hydrogen peroxide ($H_2O_2$) oxidant relative to the total amount of metal salts was added to the metal salt solution. The hydrodynamic diameter of the resulting suspension of cerium-zirconium-iron containing oxide particles was 1309 nm.

A summary of the particle sizes for Examples 1-2 are shown in Table 1.

TABLE 1

Particle Size Results for $H_2O_2$ Oxidant Level Series

| Ex. | Composition | Oxidant | Oxidant Amount | Stabilizer | Stabilizer/Total Metals Molar Ratio | Particle Size (DLS) | Comment |
|---|---|---|---|---|---|---|---|
| 1a | $CeO_{2-\delta}$ | $H_2O_2$ | 1× | MAA | 0.125 | 188 nm | Comparative |
| 1b | $CeO_{2-\delta}$ | $H_2O_2$ | 2× | MAA | 0.125 | 202 nm | Comparative |
| 2a | $Ce_{0.75}Zr_{0.15}Fe_{0.1}O_{2-\delta}$ | — | — | MAA | 0.125 | 1110 nm | Comparative |
| 2b | $Ce_{0.75}Zr_{0.15}Fe_{0.1}O_{2-\delta}$ | $H_2O_2$ | 0.2× | MAA | 0.125 | 1253 nm | Comparative |
| 2c | $Ce_{0.75}Zr_{0.15}Fe_{0.1}O_{2-\delta}$ | $H_2O_2$ | 1× | MAA | 0.125 | 698 nm | Comparative |
| 2d | $Ce_{0.75}Zr_{0.15}Fe_{0.1}O_{2-\delta}$ | $H_2O_2$ | 2× | MAA | 0.125 | 1309 nm | Comparative |

The results shown above for Examples 1a-1b indicate that the particle sizes of $CeO_{2-\delta}$ produced using a 0.125 MAA/total metals molar ratio and 1× and 2× hydrogen peroxide oxidant (188 nm and 202 nm, respectively) are substantially larger than those reported earlier (Example 3 in Poncelet et al. (FR 2885308)), wherein use of a comparable amount of the monoether carboxylic acid (3-methoxypropionic acid) without $H_2O_2$ oxidant produced cerium oxide particles with a hydrodynamic diameter of 50-60 nm. Results for Examples 2a-2d, wherein a level series in $H_2O_2$ consisting of none, 0.2×, 1× and 2× of a stoichiometric amount of the total metal salts was used along with a preferred level of monoether carboxylic acid additive (molar ratio of 0.125 MAA/total metals) according to the disclosure of Poncelet et al., and cerium, zirconium and iron as metal salts, show very poor particle sizes (698-1309 nm) relative to the previously taught levels of 50-60 nm (Example 3 in Poncelet et al. (FR 2885308)). Therefore we conclude that combining the suggestion in Cuif et al. (U.S. Pat. No. 6,133,194) to add a wide range of an oxidant, such as hydrogen peroxide, to the earlier limitations taught by Poncelet et al. (FR 2885308), namely that the molar ratio of monoether carboxylic acid additive relative to total metal ions must be in the range 0.01-0.2, fails to reduce the particle size further below that achieved without the oxidant.

Example 3 explored the use of hydrogen peroxide additive along with amounts of a monoether carboxylic acid additive well above the limit specified by Poncelet et al. (FR 2885308). A series of homogeneously iron doped cerium oxide nanoparticle preparations, $Ce_{0.6}Fe_{0.4}O_{2-\delta}$, using $H_2O_2$ oxidant and MAA stabilizer, wherein the molar ratio of MAA to total metal ions was increased from 0.155 to 2.48, were conducted.

Example 3a

Preparation of $Ce_{0.6}Fe_{0.4}O_{2-\delta}$ using $H_2O_2$ Oxidant with 0.155 MAA/Total Metals Molar Ratio (Comparative)

To a 400 ml glass beaker containing a one inch magnetic stir bar, 1.50 grams of (98%) methoxyacetic acid (MAA) and 84.7 ml of distilled water were introduced. The beaker was then placed into a water bath at a temperature of about 75° C. with constant bar stirring. A metal salt solution containing 27.0 grams of cerium (III) nitrate hexahydrate and 17.3 grams of iron (III) nitrate nonahydrate, 98% $Fe(NO_3)_3 \cdot 9H_2O$, dissolved in 40 grams distilled water, was drawn into a syringe pump and then subsequently pumped at a rate of about 12 ml/minute into the MAA containing beaker through a subsurface jet positioned close to the stir bar. Concurrent with the start of the metal salt solution addition, an aliquot of about 26 ml of concentrated (28-30%) ammonium hydroxide was pumped into the reaction vessel in a similar fashion at a rate of about 6 ml/minute. The actual amount of ammonium hydroxide to be delivered is dependent on the desired pH of the reaction Ammonium hydroxide was added until a pH of 5 was achieved at which time the addition was stopped. A 8.3 ml aqueous solution containing 7.9 grams of 50 wt. % hydrogen peroxide was then pumped into the reaction beaker at a rate of 0.83 ml/minute via a syringe pump. When all reagents had been added, the reaction mixture was an opaque dark orange brownish color containing a substantial amount of precipitate, at about a pH of 5. The reaction mixture was then heated with stirring for an additional 60 minutes at 75-80° C. degrees, during which time the pH dropped to about 3.9. Upon cooling the reaction mixture formed orange brown sediment that occupied the lower ⅔ of the reaction vessel, above which a clear yellow orange supernatant resided. Particle size analysis of the supernatant dispersion by dynamic light scattering indicated a hydrodynamic diameter of about 226 nm, whereas the sediment had a hydrodynamic diameter of about 721 nm.

Example 3b

Preparation of $Ce_{0.60}Fe_{0.40}O_{2-\delta}$ using $H_2O_2$ Oxidant with 0.31 MAA/Total Metals Molar Ratio (Inventive)

The procedures of Example 3a were repeated, except the amount of (98%) methoxyacetic acid (MAA) stabilizer was increased to 3.0 grams, such that a molar ratio of MAA to total metal ions of 0.31 was achieved. When all reagents had been added, the reaction mixture was an opaque dark orange brownish color at about a pH of 5. The reaction mixture was then heated with stirring for an additional 60 minutes at 75-80° C. degrees, during which time the pH dropped to about 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water. Particle size analysis of the clear yellow orange dispersion by dynamic light scattering indicated a hydrodynamic diameter of about 50.2 nm.

Example 3c

Preparation of $Ce_{0.60}Fe_{0.40}O_{2-\delta}$ using $H_2O_2$ Oxidant with 0.62 MAA/Total Metals Molar Ratio (Inventive)

The procedures of Example 3a were repeated, except the amount of (98%) methoxyacetic acid (MAA) stabilizer was increased to 6.0 grams, such that a molar ratio of MAA to total metal ions of 0.62 was achieved. When all reagents had been added, the reaction mixture was an opaque dark orange brownish color at about a pH of 5. The reaction mixture was then heated with stirring for an additional 60 minutes at 75-80° C. degrees, during which time the pH dropped to about 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water. Particle size analysis of the clear yellow orange dispersion by dynamic light scattering indicated a hydrodynamic diameter of about 6.9 nm.

Example 3d

Preparation of $Ce_{0.60}Fe_{0.40}O_{2-\delta}$ using $H_2O_2$ Oxidant with 1.24 MAA/Total Metals Molar Ratio (Inventive)

The procedures of Example 3a were repeated, except the amount of (98%) methoxyacetic acid (MAA) stabilizer was increased to 12.0 grams, such that a molar ratio of MAA to total metal ions of 1.24 was achieved. When all reagents had been added, the reaction mixture was an opaque dark orange brownish color at about a pH of 5. The reaction mixture was then heated with stirring for an additional 60 minutes at 75-80° C. degrees, during which time the pH dropped to about 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water. Particle size analysis of the clear yellow orange dispersion by dynamic light scattering indicated a hydrodynamic diameter of about 7.6 nm.

Example 3e

Preparation of $Ce_{0.60}Fe_{0.40}O_{2-\delta}$ using $H_2O_2$ Oxidant with 2.48 MAA/Total Metals Molar Ratio (Inventive)

The procedures of Example 3a were repeated, except the amount of (98%) methoxyacetic acid (MAA) stabilizer was increased to 24.0 grams, such that a molar ratio of MAA to total metal ions of 2.48 was achieved. When all reagents had been added, the reaction mixture was an opaque dark orange brownish color at about a pH of 5. The reaction mixture was then heated with stirring for an additional 60 minutes at 75-80° C. degrees, during which time the pH dropped to about 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water. Particle size analysis of the clear yellow orange dispersion by dynamic light scattering indicated a hydrodynamic diameter of about 6.2 nm.

Table 2 lists the hydrodynamic diameter (DLS) particle size results for the cerium and iron containing particles of Example 3, which were prepared with $H_2O_2$ oxidant and various amounts of MAA stabilizer.

TABLE 2

Size Results for use of $H_2O_2$ oxidant with MAA Stabilizer Level Series

| Ex. | Composition (Method 1) | Oxidant | Stabilizer | Stabilizer/Total Metals Molar Ratio | Particle Size (DLS) | Comment |
|---|---|---|---|---|---|---|
| 3a | $Ce_{0.6}Fe_{0.4}O_{2-\delta}$ | $H_2O_2$ | MAA | 0.155 | 226.0 nm | Comparative |
| 3b | $Ce_{0.6}Fe_{0.4}O_{2-\delta}$ | $H_2O_2$ | MAA | 0.31 | 50.2 nm | Inventive |
| 3c | $Ce_{0.6}Fe_{0.4}O_{2-\delta}$ | $H_2O_2$ | MAA | 0.62 | 6.9 nm | Inventive |
| 3d | $Ce_{0.6}Fe_{0.4}O_{2-\delta}$ | $H_2O_2$ | MAA | 1.24 | 7.4 nm | Inventive |
| 3e | $Ce_{0.6}Fe_{0.4}O_{2-\delta}$ | $H_2O_2$ | MAA | 2.48 | 6.2 nm | Inventive |

Comparison of the particle size (DLS) results shown above for Example 3a to Examples 3b-3d indicates that a surprising and dramatic decrease in particle size when the molar ratio of methoxyacetic acid stabilizer (MAA) to total metals is greater than 0.2, for homogeneously iron doped cerium-containing oxide nanoparticles prepared using hydrogen peroxide oxidant. Results of OSC measurements also showed an increase with increased MAA stabilizer level.

Examples 4-8 compare a commercially obtained ceria nanoparticle sample to undoped and homogeneously doped cerium-containing nanoparticles prepared by a process (Method 1) comprising the sequential steps: 1) providing an aqueous solution of a methoxyacetic acid stabilizer, 2) concurrent addition of metal salts along with addition of hydroxide ion, 3) addition of hydrogen peroxide oxidant, wherein the molar ratio of methoxyacetic acid stabilizer to total metals was 2.35.

Example 4a

Commercial Cerium(IV) Oxide Nanopowder

Cerium(IV) oxide nanopowder, <25 nm particle size (BET) was purchased from Sigma-Aldrich® and characterized as received by TEM and OSC. However, examination by TEM revealed a highly aggregated material with chunks on the order of 20 microns. This is consistent with the instructions received from the vendor that the material could be ball milled by the end user to a size less than 25 nm.

Example 4b

Figure 1B:
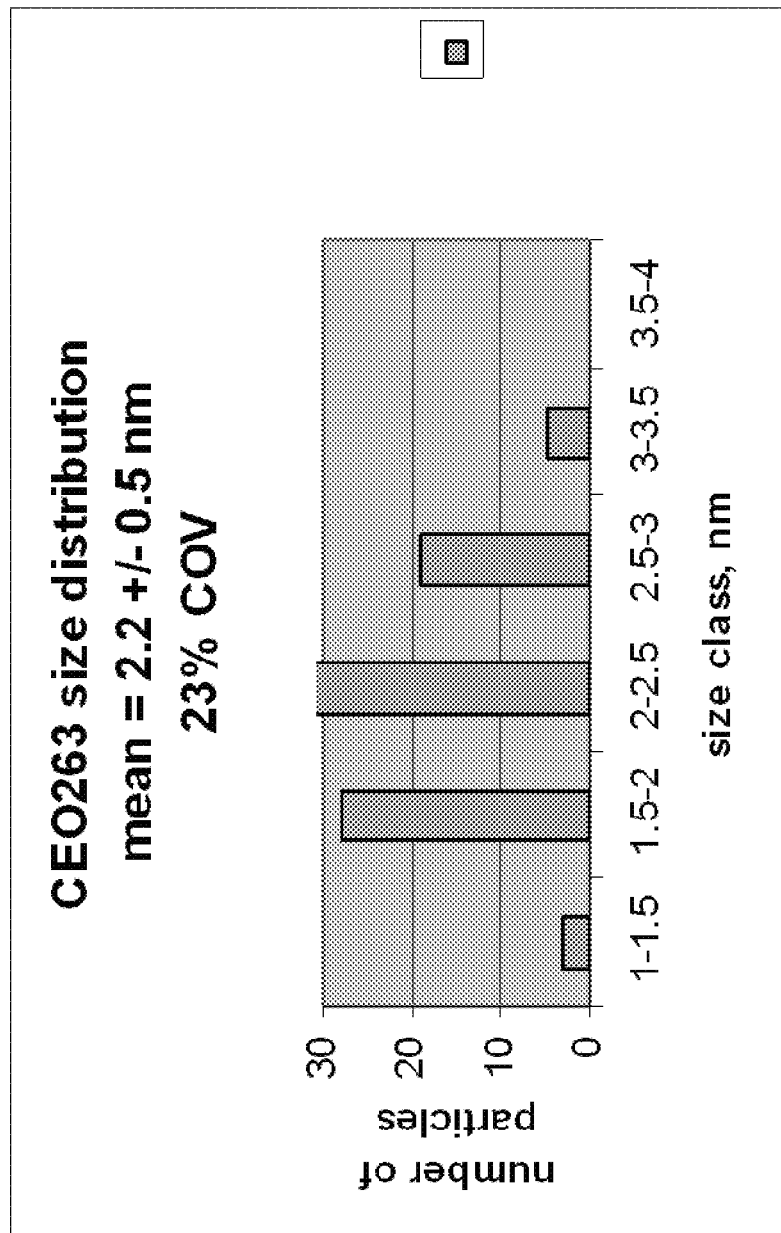

Preparation of $CeO_{2-\delta}$ Nanoparticles by Isothermal Double-Jet Precipitation To a 3 liter round bottom stainless steel reactor vessel was added 1117 grams of distilled water. An impeller (Lightnin® R-100 Rushton style turbine) was lowered into the reactor vessel, and the mixer head was positioned slightly above the bottom of the reactor vessel. The mixer was set to 700 rpm, and the reactor was brought to a temperature of about 70° C. Then 59.8 grams (98%) of methoxyacetic acid were added to the reactor. A double jet precipitation was conducted over a period of five minutes by pumping a 250 ml solution containing 120.0 grams of $Ce(NO_3)_3.6H_2O$ into the reactor concurrently with a solution containing 69.5 grams (28-30%) of ammonium hydroxide. A distilled water chase into the reactor cleared the reactant lines of residual materials. Then 10.2 grams of 50% non-stabilized hydrogen peroxide was added to the reactor and its contents over a period of 40 seconds. Initially, the reaction mixture was an opaque dark orange brownish liquid in the pH range 6 to 7. The reaction mixture was heated for an additional 60 minutes, during which time the pH dropped to 4.25 (consistent with the release of hydronium ion via reactions (3a) and (3b) and the mixture became clear yellow orange color. The reaction was cooled to 20° C. and diafiltered to a conductivity of 3 mS/cm to remove excess water and unreacted materials. This resulted in concentrating the dispersion by a factor of about 10, or nominally 1 Molar in $CeO_2$ particles. FIG. 1A is a high magnification TEM of a dispersion of particles of Example 5, from which a particle size-frequency analysis (FIG. 1B) revealed a mean particle size of 2.2±0.5 nm, with size frequency distribution having a coefficient of variation, COV, (one standard deviation divided by the mean diameter) of 23%. The calculated yield was 62.9%.

Example 5

Iron-Containing $CeO_2$ Nanoparticles: $Ce_{0.9}Fe_{0.1}O_{2-\delta}$

Figure 2A:
FIGS. 2A and 2B are, respectively, a TEM image and a particle size-frequency analysis by TEM of isothermally prepared Fe-containing $CeO_{2-\delta}$ nanoparticles, prepared as described in Example 5.
Figure 2B:
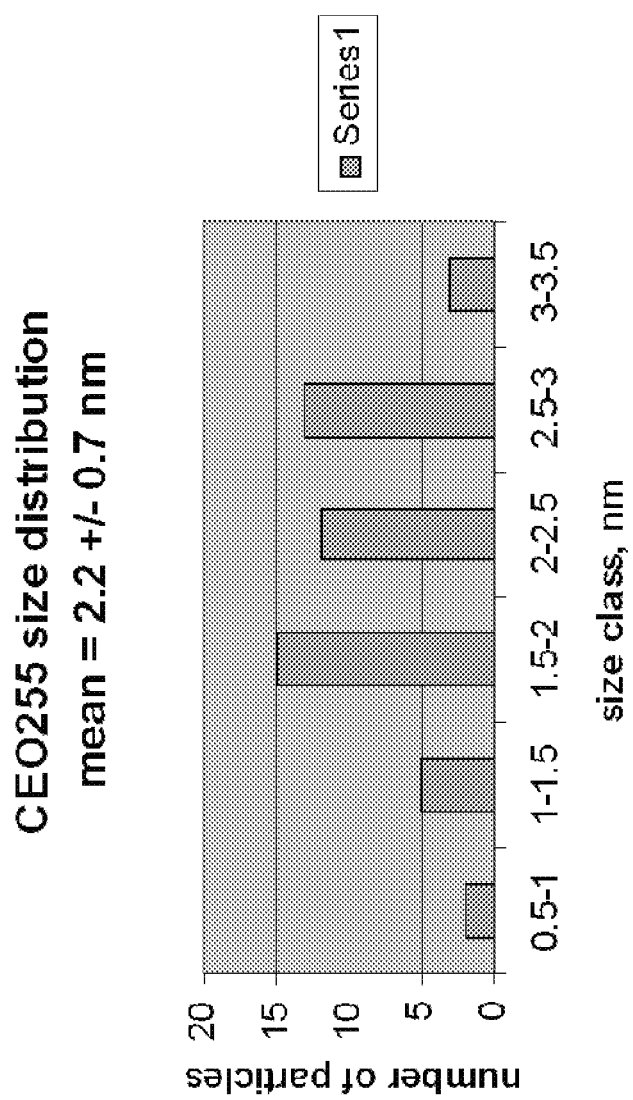

The conditions of Example 4 were repeated, except that the metal salts solution contained 108.0 grams of cerium nitrate hexahydrate, and 11.16 grams of $Fe(NO_3)_3 \cdot 9H_2O$. These metal salts were dissolved separately and then combined to form a 250 ml solution. The reaction proceeded as described in Example 5. FIG. 2A is a high magnification TEM of the dispersed particles, from which a particle size-frequency analysis (FIG. 2B) revealed a mean particle size of 2.2±0.7 nm, with size frequency distribution having a coefficient of variation, COV, (one standard deviation divided by the mean diameter) of 32%. The calculated yield was 55.1%.

Example 6

Zirconium-Containing $CeO_2$ Nanoparticles: $Ce_{0.85}Zr_{0.15}O_{2-\delta}$

Figure 3A:
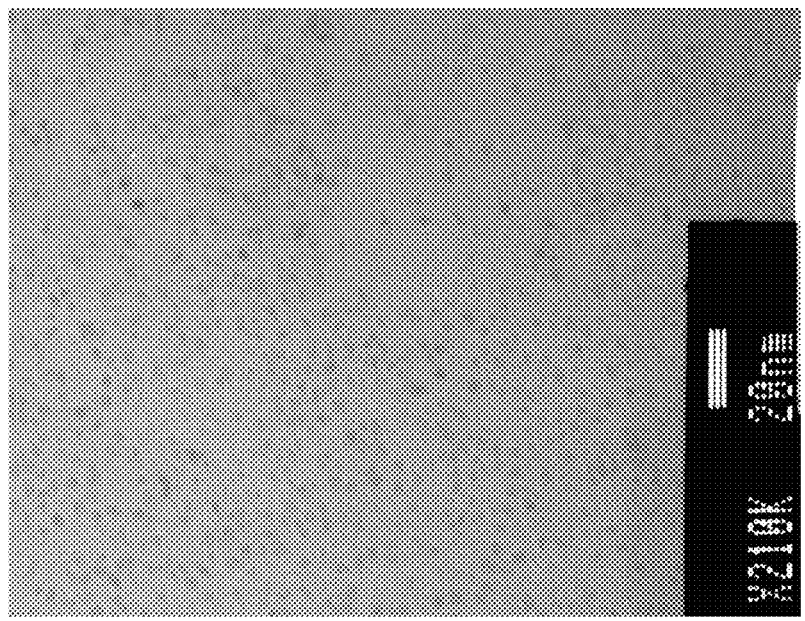
FIGS. 3A and 3B are, respectively, a TEM image and a particle size-frequency analysis by TEM of isothermally prepared Zr-containing $CeO_{2-\delta}$ nanoparticles, prepared as described in Example 6.
Figure 3B:
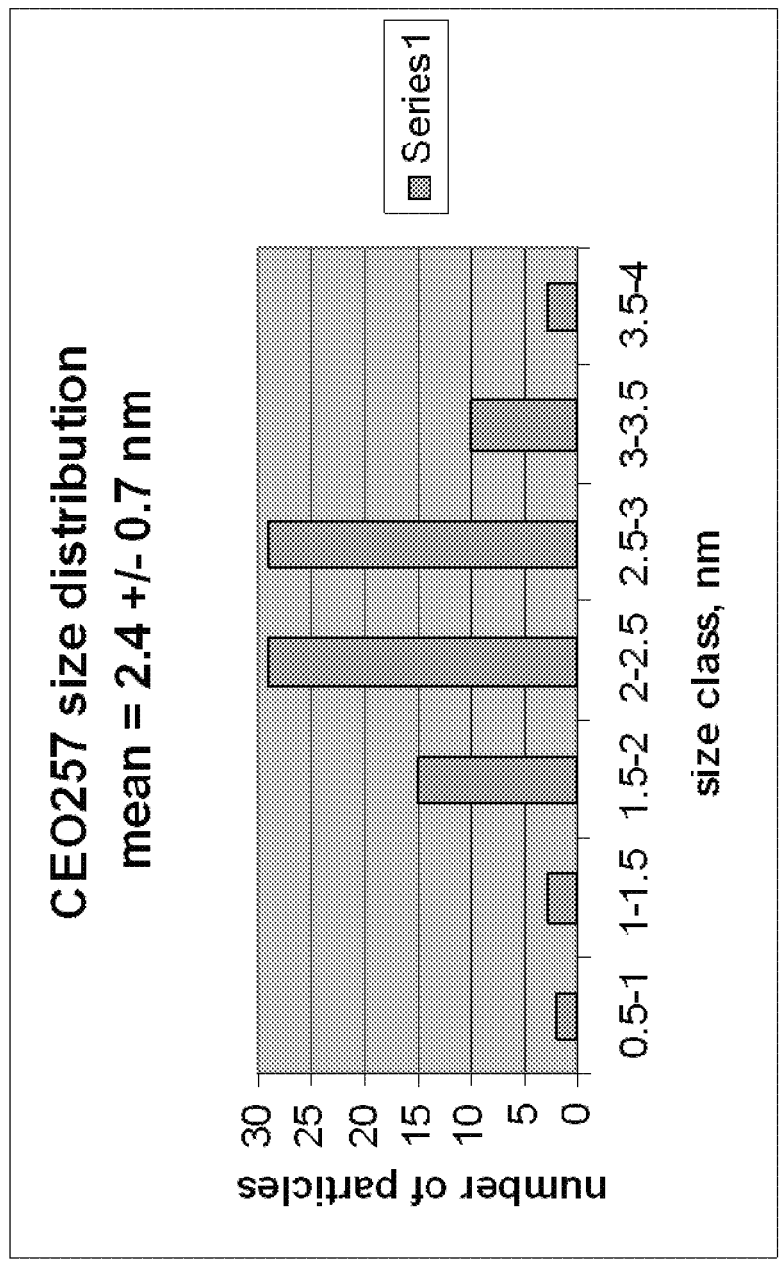

The conditions of Example 4 were repeated except that the metal salts solution contained 101.89 grams of cerium nitrate hexahydrate, and 9.57 grams of $ZrO(NO_3)_2 \cdot xH_2O$. These metal salts were dissolved separately and then combined to form a 250 ml solution. The reaction proceeded as described in Example 5, except that the temperature of the reaction was carried out at 85° C. Particle size-frequency analysis by transmission electron micrography (FIGS. 3A and 3B) revealed a mean particle size of 2.4±0.7 nm, with size frequency distribution having a coefficient of variation, COV, (one standard deviation divided by the mean diameter) of 29%. Inductively coupled plasma atomic emission spectroscopy revealed a stoichiometry of $Ce_{0.82}Z_{0.18}O_{1.91}$, which given the relative insolubility of $ZrO_2$ to $CeO_2$, would account for the enhanced Zr content (18% vs 15%).

Example 7a

Figure 4A:
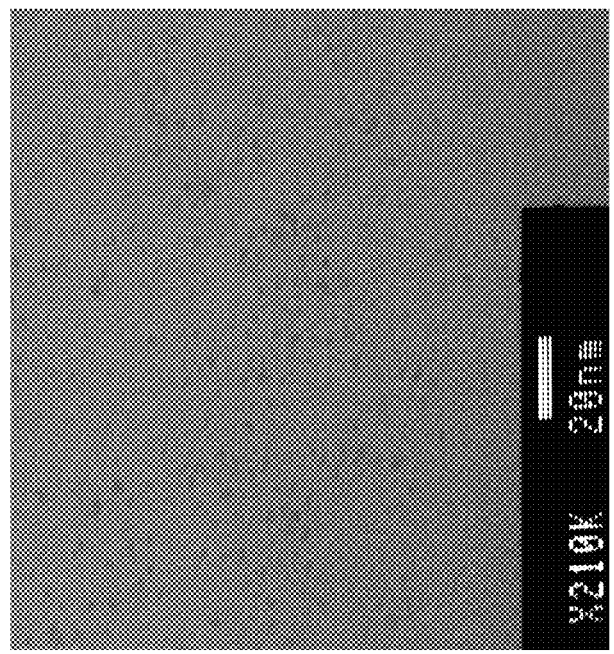
Figure 4B:
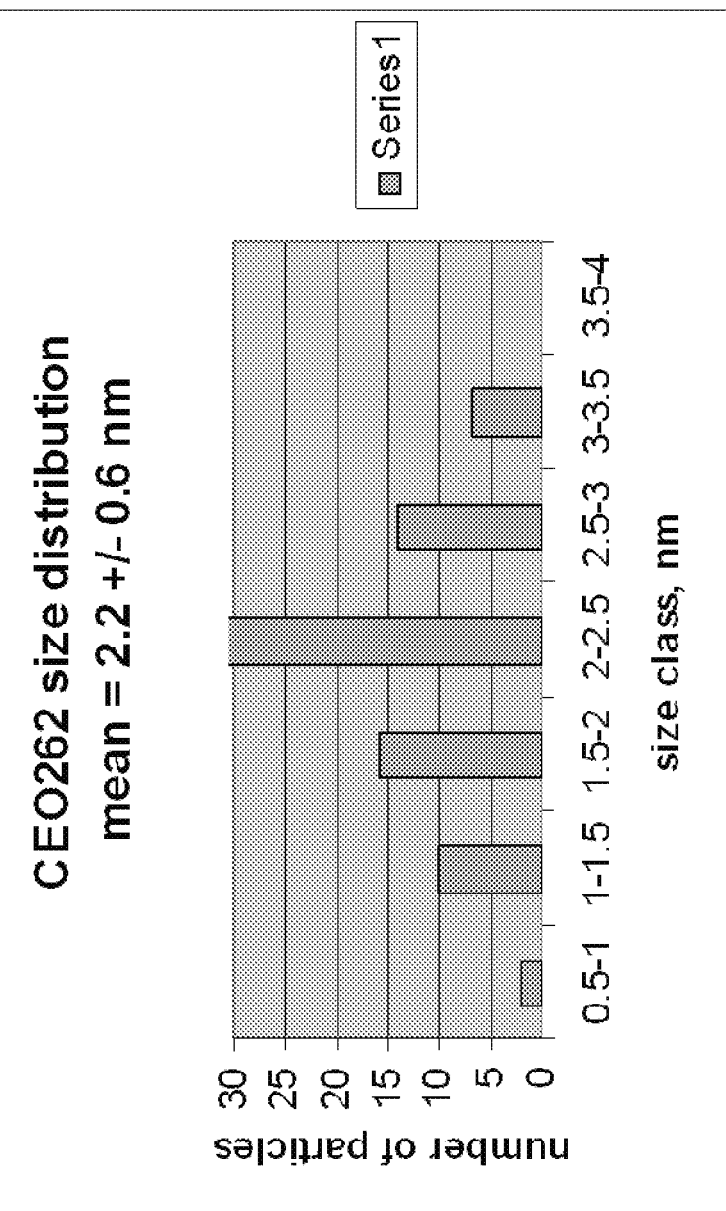
Figure 4C:
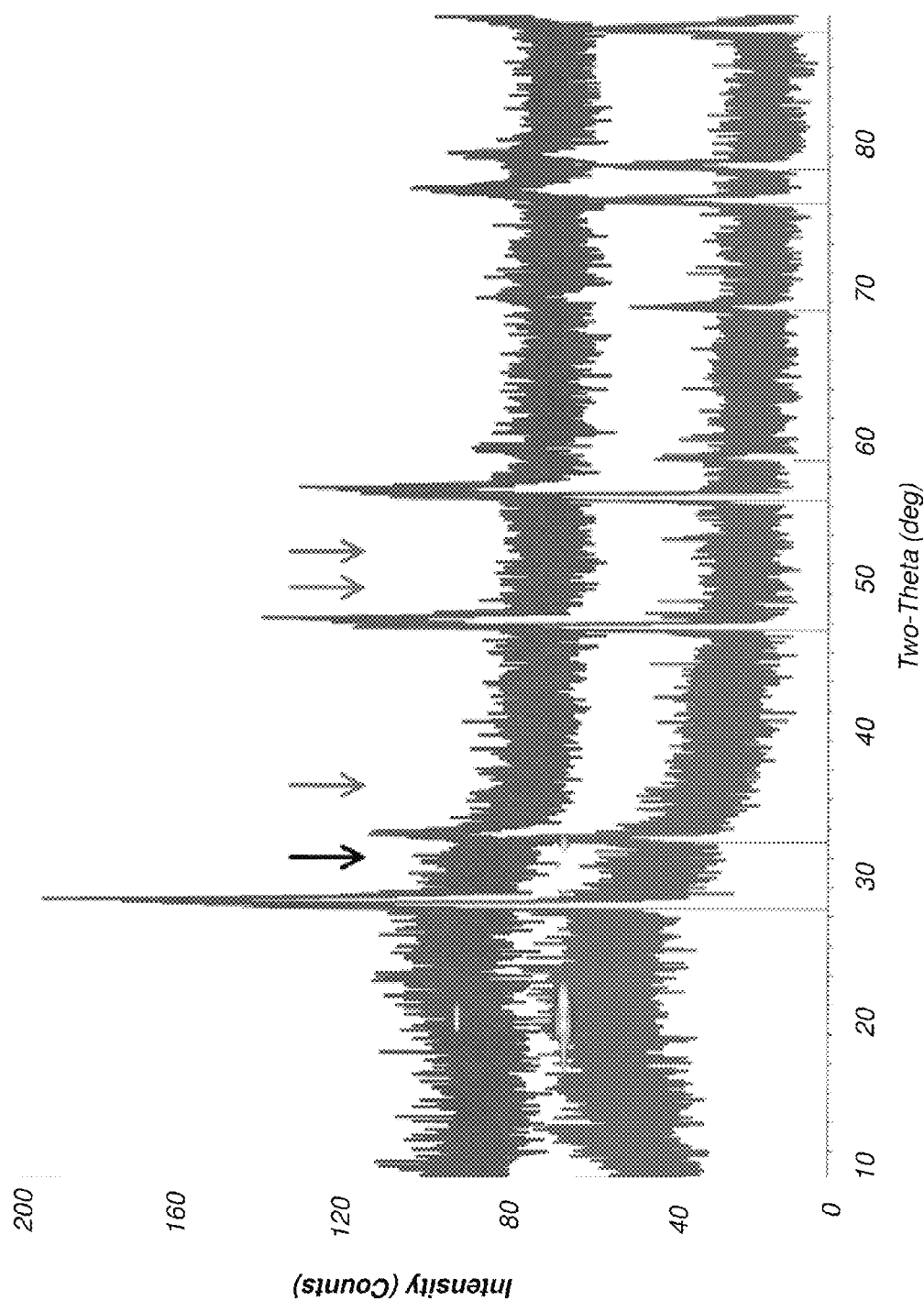

Zirconium and Iron Containing $CeO_2$ Nanoparticles: $Ce_{0.75}Zr_{0.15}Fe_{0.10}O_{2-\delta}$ The conditions of Example 44 were repeated, except that the metal salts solution contained 84.0 grams of cerium nitrate hexahydrate, 11.16 grams of $Fe(NO_3)_3 \cdot 9H_2O$ and 12.76 grams of $ZrO(NO_3)_2 \cdot xH_2O$. These metal salts were dissolved separately and then combined to form a 250 ml solution. The reaction proceeded as described in Example 4, except that the temperature of the reaction was carried out at 85° C., and the hydrogen peroxide solution (50%) was elevated to 20.4 gm and added over a period of ten minutes. Particle TEM (FIG. 4A) and particle size-frequency analysis by transmission electron micrography (FIG. 4B) revealed a mean particle size of 2.2±0.6 nm, with size frequency distribution having a coefficient of variation, COV, (one standard deviation divided by the mean diameter) of 27%. A monodisperse, unimodal distribution supports the idea of co-incorporation of zirconium and iron ions into a ceria host particle, however, separately nucleated or renucleated zirconia rich and/or iron oxide rich grain populations, for example, may also be present. The calculated yield was 78%. Inductively coupled plasma atomic emission spectroscopy revealed a stoichiometry of $Ce_{(0.69)}Fe_{(0.14)}Zr_{(0.17)}O_{(1.915)}$. Again, the relatively more concentrated Fe and Zr with respect to the nominal amounts may reflect the greater insolubility of their hydroxide precursors relative to that of cerium hydroxide. Also in FIG. 4C is an x-ray powder diffraction pattern of this sample (top curve) compared to the transition metal free $CeO_2$. The lack of a peak (denoted by an arrow) at 32 deg two theta means that there is no evidence of free $ZrO_2$, i.e., it may be fully incorporated into the cerium lattice. Also, the lack of peaks at 50 and 52 degrees two theta indicate no evidence of a separate population of $Fe_2O_3$ (i.e. consistent with incorporation of Fe into the cerium lattice). Note the shift to larger two theta at large two theta scattering angle, which indicates a distortion or contraction of the lattice-(n λ/2d=sin θ), is consistent with the smaller ionic radii of $Fe^{3+}$ (0.78A) and $Zr^{4+}$ (0.84A) relative to the $Ce^{4+}$ (0.97A) which it is replacing. Thus, we note evidence that the transition metals zirconium and iron may be incorporated into the $CeO_2$ lattice, although separate populations of poorly crystalline or amorphous nanoparticles of, for example, zirconium-rich oxides and/or iron-rich oxides may also be present.

Examples 7b-f

Zirconium and Iron Containing $CeO_2$ Nanoparticles: $Ce_{(1-x-y)}Zr_xFe_yO_{2-\delta}$. (x=0.15, 0.20; y=0.15-0.30)

The conditions of Example 7a were repeated; however the amount of iron or zirconium was adjusted to give the nominal stoichiometries indicated in Table 3 below, using the appropriate metal containing salt solution, while the overall cerium nitrate hexahydrate was reduced to accommodate the increased concentration of the iron or zirconium transition metal salts in the reaction mixture.

Example 8

Precipitation of Iron Oxides (Comparative)

The conditions of Example 4 were repeated, except that the metal salts solution containing $Ce(NO_3)_3 \cdot 6H_2O$ was replaced with an equimolar amount (111.6 grams) of $Fe(NO_3)_3 \cdot 9H_2O$. The product of the reaction was a turbid brown solution which separated into a lower sediment portion and an upper portion that settled failed to clarify upon extended standing.

Figure 5B:
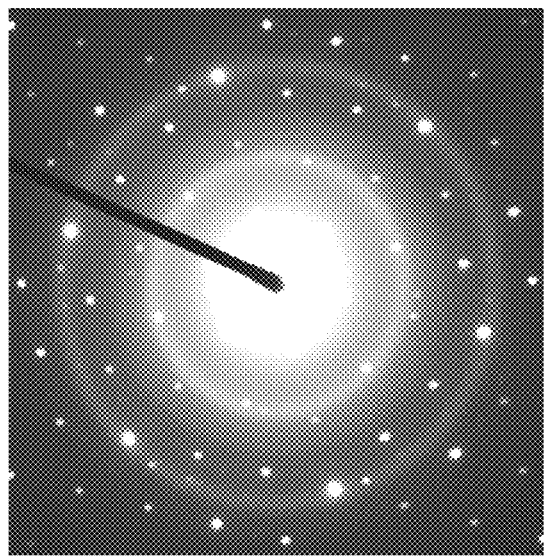
FIG. 5B is an electron diffraction pattern of these micron sized iron containing oxide particles prepared as described in Example 8.
Figure 5A:
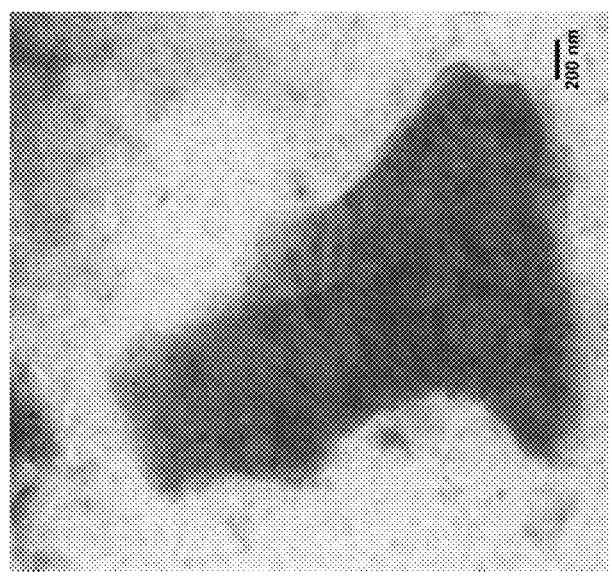
FIG. 5A is a TEM image of a approximately 0.8 micrometer iron containing oxide particle prepared as described in Example 8.

FIG. 5A is a TEM image representative of the particles prepared in Example 8, wherein an approximately 0.8 micrometer diameter iron containing oxide particle is shown. FIG. 5B is an electron diffraction pattern of the micron sized iron containing oxide particles prepared in Example 8. The electron diffraction peaks are most consistent with hydrated iron oxide phases known as iron oxyhydroxide.

Table 3 shown in FIG. 6 contains the particle size, Oxygen Storage Capacity and rate results for the homogeneously doped (Method 1) cerium and iron-containing nanoparticles of Examples 4-7.

Comparison of the results shown in Table 3 of FIG. 6 for Example 4b to Example 4a shows a modest increase in OSC for nanoceria prepared using Method 1, wherein hydrogen peroxide oxidant and a molar ratio of 2.35 methoxyacetic acid stabilizer to total metals were used, relative to the commercial SigmaAldrich® cerium(IV) oxide nanopowder comparison. Comparison of Examples 5 and 6 to Examples 4a-4-b shows an OSC increase of about 2.5× when iron is substituted for 10% of the cerium, and a 1.7× increase when zirconium is substituted for 15% of the cerium. Comparison of Example 7 to Examples 4b, 5 and 6 indicates that the OSC increase due to iron and zirconium co-doping is essentially additive relative to the effect of each dopant metal alone. Comparison between Examples 7b and 7e shows that at a fixed zirconium level, an increasing amount of iron results in a further increase in OSC. Comparison of Example 7f to Example 7c shows substantially the same OSC when the iron content is the same. In summary, dramatic increases in OSC are seen when up to 40% of the cerium is replaced by zirconium, iron, or a combination thereof, in nanoparticles prepared using homogeneous doping Method 1, wherein hydrogen peroxide oxidant and a molar ratio of methoxyacetic acid stabilizer to total metals of 2.35 were employed. In addition, iron doping has a stronger impact than zirconium in increasing OSC, although at lower doping levels the effects of the dopant metals on OSC are additive.

Examples 9-10

These Examples used a nanoparticle preparation process (Method 2) comprising the sequential steps: 1) providing an aqueous solution of methoxyacetic acid stabilizer 2) concurrent addition of a first portion of metal salts along with addition of hydroxide ion, 3) addition of hydrogen peroxide oxidant, 4) addition of a second portion of metal salts; wherein the molar ratio of methoxyacetic acid stabilizer to total metals was 2.55.

Example 9

Preparation of Cerium Dioxide Nanoparticles (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant bar stirring. A metal salt solution containing 7.53 grams of cerium (III) nitrate hexahydrate dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. After completion of the hydrogen peroxide addition, a solution containing 7.53 grams of cerium (III) nitrate hexahydrate dissolved in 10 ml of distilled water (total solution volume 10-11 ml) was added at a rate of 3 ml/minute. The reaction mixture was an opaque dark orange brownish color at about a pH of 5. The reaction mixture was then heated for an additional 60 minutes at 85° C., during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water.

Examples 10a-10d

Preparation of Homogeneously Doped Cerium Dioxide Nanoparticles: $Ce_{(1-x-y)}Zr_xFe_yO_{2-\delta}$ (Inventive)

Example 10a

Preparation of $Ce_{0.85}Zr_{0.15}O_{2-\delta}$

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant bar stirring. A metal salt solution containing 6.40 grams of cerium (III) nitrate hexahydrate and 0.60 grams of zirconyl nitrate hydrate dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. After completion of the hydrogen peroxide addition, a solution containing 6.40 grams of cerium (III) nitrate hexahydrate and 0.60 grams of zirconyl nitrate hydrate dissolved in 10 ml of distilled water (total solution volume 10-11 ml) was added at a rate of 3 ml/minute. The reaction mixture was an opaque dark orange brownish color at about a pH of 5. The reaction mixture was then heated for an additional 60 minutes at 85° C. degrees, during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water.

Examples 10b

Preparation of $Ce_{0.6}Fe_{0.4}O_{2-\delta}$

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant bar stirring. A metal salt solution containing 4.52 grams of cerium (III) nitrate hexahydrate and 2.80 grams of iron (III) nitrate nonahydrate, 98% $Fe(NO_3)_3 \cdot 9H_2O$, dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. After completion of the hydrogen peroxide addition, a solution containing 4.52 grams of cerium (III) nitrate hexahydrate and 2.80 grams of iron (III) nitrate nonahydrate, 98% $Fe(NO_3)_3 \cdot 9H_2O$, dissolved in 10 ml of distilled water (total solution volume 10-11 ml) was added at a rate of 3 ml/minute. The reaction mixture was an opaque dark orange brownish color at about a pH of 5. The reaction mixture was then heated for an additional 60 minutes at 85° C. degrees, during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water. A visual assessment of a TEM micrograph of particles of the final dispersion indicated a particle diameter of 3-5 nm.

Examples 10c

Preparation of $Ce_{0.45} Zr_{0.15}Fe_{0.40}O_{2-\delta}$

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant bar stirring. A metal salt solution containing 3.39 grams of cerium (III) nitrate hexahydrate, 0.60 grams of zirconyl nitrate hydrate and 2.80 grams of iron (III) nitrate nonahydrate, 98% $Fe(NO_3)_3.9H_2O$, dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. After completion of the hydrogen peroxide addition, a solution containing 3.39 grams of cerium (III) nitrate hexahydrate, 0.60 grams of zirconyl nitrate hydrate and 2.80 grams of iron (III) nitrate nonahydrate, 98% $Fe(NO_3)_3.9H_2O$, dissolved in 10 ml of distilled water (total solution volume 10-11 ml) was added at a rate of 3 ml/minute. The reaction mixture was an opaque dark orange brownish color at about a pH of 5. The reaction mixture was then heated for an additional 60 minutes at 85° C. degrees, during which time the pH dropped to 3.8, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water.

Examples 10d

Preparation of $Ce_{0.30} Zr_{0.30}Fe_{0.40}O_{2-\delta}$

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant bar stirring. A metal salt solution containing 2.26 grams of cerium (III) nitrate hexahydrate, 1.20 grams of zirconyl nitrate hydrate and 2.80 grams of iron (III) nitrate nonahydrate, 98% $Fe(NO_3)_3.9H_2O$, dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. After completion of the hydrogen peroxide addition, a solution containing 2.26 grams of cerium (III) nitrate hexahydrate, 1.20 grams of zirconyl nitrate hydrate and 2.80 grams of iron (III) nitrate nonahydrate, 98% $Fe(NO_3)_3.9H_2O$, dissolved in 10 ml of distilled water (total solution volume 10-11 ml) was added at a rate of 3 ml/minute. The reaction mixture was an opaque dark orange brownish color at about a pH of 5. The reaction mixture was then heated for an additional 60 minutes at 85° C. degrees, during which time the pH dropped to 3.6, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water.

Samples of the materials prepared as described above in Examples 9 and 10a-10d were evaluated for OSC and rate by the procedures described above. Results are contained in Table 4.

TABLE 4

| Ex. | Composition (Method 2) | OSC ($\mu moleO_2/g$) | Rate Constant $\times 10^3$ ($min^{-1}$) | Comment |
|---|---|---|---|---|
| 9 | $CeO_2$ | 265.8 | 1.3 | Inventive |
| 10a | $Ce_{0.85}Zr_{0.15}O_{2-\delta}$ | 855.6 | 3.9 | Inventive |
| 10b | $Ce_{0.60}Fe_{0.40}O_{2-\delta}$ | 4461.2 | 24.5 | Inventive |
| 10c | $Ce_{0.45}Zr_{0.15}Fe_{0.40}O_{2-\delta}$ | 4361.8 | 7.2 | Inventive |
| 10d | $Ce_{0.30}Zr_{0.30}Fe_{0.40}O_{2-\delta}$ | 4313.6 | 10.7 | Inventive |

Comparison of the results shown above for Example 9 to those of Examples 10a-10d shows a dramatic increase in both OSC and rate when 15-70% of the cerium is replaced by zirconium, iron, or a combination thereof, in nanoparticles prepared using homogeneous doping Method 2, hydrogen peroxide oxidant, and a molar ratio of methoxyacetic acid stabilizer to total metals of 2.55.

Examples 11-12

These Examples used a nanoparticle preparation process (Method 3) comprising the steps: 1) providing an aqueous solution of methoxyacetic acid stabilizer, 2) concurrent addition of a first portion of metal salts along with addition of hydroxide ion, 3) addition of a first portion hydrogen peroxide oxidant, 4) concurrent addition of a second portion of metal salts along with a second portion of hydrogen peroxide oxidant; wherein the molar ratio of methoxyacetic acid stabilizer to total metals was 2.55.

Example 11

Preparation of Cerium Dioxide Nanoparticles (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant bar stirring. A metal salt solution containing 7.53 grams of cerium (III) nitrate hexahydrate dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 7.53 grams of cerium (III) nitrate hexahydrate dissolved in 10 ml of distilled water (total solution volume 10-11 ml) was added at a rate of 3 ml/minute concurrently with the remaining half of the hydrogen peroxide. The reaction mixture was an opaque dark orange brownish color at about a pH of 5. The reaction mixture was then heated for an additional 60 minutes at 85° C. degrees, during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water.

Examples 12a-12d

Preparation of Homogeneously Doped Cerium Dioxide Nanoparticles $Ce_{(1-x-y)}Zr_xFe_yO_{2-\delta}$ Method 3 (Inventive) [MW-73]

Example 12a

Preparation of $Ce_{0.85}Zr_{0.15}O_{2-\delta}$ (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant bar stirring. A metal salt solution containing 6.40 grams of cerium (III) nitrate hexahydrate and 0.60 grams of zirconyl nitrate hydrate dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 6.40 grams of cerium (III) nitrate hexahydrate and 0.60 grams of zirconyl nitrate hydrate dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color at about a pH of 5. The reaction mixture was then heated for an additional 60 minutes at 85° C. degrees, during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water.

Example 12b

Preparation of $Ce_{0.60}Fe_{0.40}O_{2-\delta}$ (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant bar stirring. A metal salt solution containing 4.52 grams of cerium (III) nitrate hexahydrate and 2.80 grams of iron (III) nitrate nonahydrate, 98% $Fe(NO_3)_3.9H_2O$, dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 4.52 grams of cerium (III) nitrate hexahydrate and 2.80 grams of iron (III) nitrate nonahydrate, 98% $Fe(NO_3)_3.9H_2O$, dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color at about a pH of 5. The reaction mixture was then heated for an additional 60 minutes at 85° C. degrees, during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water. A visual assessment of a TEM micrograph of particles of the final dispersion indicated a particle diameter of 3-5 nm.

Example 12c

Preparation of $Ce_{0.45}Zr_{0.15}Fe_{0.40}O_{2-\delta}$ (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant bar stirring. A metal salt solution containing 3.39 grams of cerium (III) nitrate hexahydrate, 0.60 grams of zirconyl nitrate hydrate and 2.80 grams of iron (III) nitrate nonahydrate, 98% $Fe(NO_3)_3.9H_2O$, dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 3.39 grams of cerium (III) nitrate hexahydrate, 0.60 grams of zirconyl nitrate hydrate and 2.80 grams of iron (III) nitrate nonahydrate, 98% $Fe(NO_3)_3.9H_2O$, dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color at about a pH of 5. The reaction mixture was then heated for an additional 60 minutes at 85° C. degrees, during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water.

Example 12d

Preparation of $Ce_{0.30}Zr_{0.30}Fe_{0.40}O_{2-\delta}$ (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant bar stirring. A metal salt solution containing 2.26 grams of cerium (III) nitrate hexahydrate, 1.20 grams of zirconyl nitrate hydrate and 2.80 grams of iron (III) nitrate nonahydrate, 98% $Fe(NO_3)_3.9H_2O$, dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 2.26 grams of cerium (III) nitrate hexahydrate, 1.20 grams of zirconyl nitrate hydrate and 2.80 grams of iron (III) nitrate nonahydrate, 98% $Fe(NO_3)_3.9H_2O$, dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color at about a pH of 5. The reaction mixture was then heated for an additional 60 minutes at 85° C. degrees, during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water.

Samples of the materials prepared as described above in Examples 11 and 12a-12d were evaluated for OSC and rate by the procedures described above. Results are contained in Table 5.

TABLE 5

| Ex. | Composition (Method 3) | OSC ($\mu moleO_2/g$) | Rate Constant $\times 10^3$ ($min^{-1}$) | Comment |
|---|---|---|---|---|
| 11 | $CeO_2$ | 270.2 | 1.9 | Inventive |
| 12a | $Ce_{0.85}Zr_{0.15}O_{2-\delta}$ | 1052.4 | 5.5 | Inventive |
| 12b | $Ce_{0.60}Fe_{0.40}O_{2-\delta}$ | 5044.1 | 12.9 | Inventive |
| 12c | $Ce_{0.45}Zr_{0.15}Fe_{0.40}O_{2-\delta}$ | 4237.9 | 7.8 | Inventive |
| 12d | $Ce_{0.30}Zr_{0.30}Fe_{0.40}O_{2-\delta}$ | 3759.8 | 6.0 | Inventive |

Comparison of the results for comparative Example 11 to those of Examples 12a-12d shows a dramatic increase in both OSC and rate when 15-70% of the cerium is replaced by zirconium, iron, or a combination thereof, in nanoparticles prepared using homogeneous doping Method 3, hydrogen peroxide oxidant, and a molar ratio of methoxyacetic acid stabilizer to total metals of 2.55.

Examples 13-14

These Examples used a nanoparticle preparation process (Method 3) comprising the steps: 1) providing an aqueous solution of methoxyacetic acid stabilizer, 2) concurrent addition of a first portion of metal salts along with addition of hydroxide ion, 3) addition of a first portion hydrogen peroxide oxidant, 4) concurrent addition of a second portion of metal salts along with a second portion of hydrogen peroxide oxidant; wherein the molar ratio of methoxyacetic acid stabilizer to total metals was about 2.55.

Example 13

Preparation of Cerium Dioxide Nanoparticles (Inventive) Method 3 [MW-73]

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 65° C. with constant bar stirring. A metal salt solution containing 7.53 grams of cerium (III) nitrate hexahydrate dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 7.53 grams of cerium (III) nitrate hexahydrate dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color at about a pH of 5. The reaction mixture was then heated for an additional 60 minutes at 65° C. degrees, during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water.

Example 14a-14e

Preparation of Homogeneously Doped Cerium Dioxide Nanoparticles $Ce_{1-x}Fe_xO_{2-\delta}$ (Inventive)

Example 14a

Preparation of $Ce_{0.6}Fe_{0.4}O_{2-\delta}$ (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 65° C. with constant bar stirring. A metal salt solution containing 4.52 grams of cerium (III) nitrate hexahydrate and 2.80 grams of iron (III) nitrate nonahydrate, 98% $Fe(NO_3)_3 \cdot 9H_2O$, dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 4.52 grams of cerium (III) nitrate hexahydrate and 2.80 grams of iron (III) nitrate nonahydrate, 98% $Fe(NO_3)_3 \cdot 9H_2O$, dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color at about a pH of 5. The reaction mixture was then heated for an additional 60 minutes at 65° C., during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water. Particle size analysis of the clear yellow orange dispersion by dynamic light scattering indicated a hydrodynamic diameter of about 12 nm.

Example 14b

Preparation of $Ce_{0.4}Fe_{0.6}O_{2-\delta}$ (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 65° C. with constant bar stirring. A metal salt solution containing 3.01 grams of cerium (III) nitrate hexahydrate and 4.20 grams of iron (III) nitrate nonahydrate, 98% $Fe(NO_3)_3 \cdot 9H_2O$, dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 3.01 grams of cerium (III) nitrate hexahydrate and 4.20 grams of iron (III) nitrate nonahydrate, 98% $Fe(NO_3)_3 \cdot 9H_2O$, dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color at about a pH of 5. The reaction mixture was then heated for an additional 60 minutes at 65° C., during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water.

Example 14c

Preparation of $Ce_{0.3}Fe_{0.7}O_{2-\delta}$ (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 65° C. with constant bar stirring. A metal salt solution containing 2.26 grams of cerium (III) nitrate hexahydrate and 4.90 grams of iron (III) nitrate nonahydrate, 98% $Fe(NO_3)_3 \cdot 9H_2O$, dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 2.26 grams of cerium (III) nitrate hexahydrate and 4.90 grams of iron (III) nitrate nonahydrate, 98% $Fe(NO_3)_3 \cdot 9H_2O$, dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color at about a pH of 5. The reaction mixture was then heated for an additional 60 minutes at 65° C., during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water. Particle size-frequency analysis by transmission electron micrography revealed a mean particle size of 3.7±1.0 nm, with size frequency distribution having a coefficient of variation, COV, (one standard deviation divided by the mean diameter) of 27%. Alternatively, after several months of storage at room temperature, a particle size analysis of the clear yellow orange dispersion by dynamic light scattering indicated a hydrodynamic diameter of about 6 nm.

Example 14d

Preparation of $Ce_{0.2}Fe_{0.8}O_{2-\delta}$ (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 65° C. with constant bar stirring. A metal salt solution containing 1.505 grams of cerium (III) nitrate hexahydrate and 5.60 grams of iron (III) nitrate nonahydrate, 98% $Fe(NO_3)_3.9H_2O$, dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 1.505 grams of cerium (III) nitrate hexahydrate and 5.60 grams of iron (III) nitrate nonahydrate, 98% $Fe(NO_3)_3.9H_2O$, dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color at about a pH of 5. The reaction mixture was then heated for an additional 60 minutes at 65° C., during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water. Particle size analysis of the clear yellow orange dispersion by dynamic light scattering indicated a hydrodynamic diameter of about 12 nm.

Example 14e

Preparation of $Ce_{0.1}Fe_{0.9}O_{2-\delta}$ (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 65° C. with constant bar stirring. A metal salt solution containing 0.7525 grams of cerium (III) nitrate hexahydrate and 6.30 grams of iron (III) nitrate nonahydrate, 98$Fe(NO_3)_3.9H_2O$, dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 0.7525 grams of cerium (III) nitrate hexahydrate and 6.30 grams of iron (III) nitrate nonahydrate, 98% $Fe(NO_3)_3.9H_2O$, dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color at about a pH of 5. The reaction mixture was then heated for an additional 60 minutes at 65° C., during which time the pH dropped to 3.9, and the mixture became a clear yellow orange color. The reaction mixture was cooled with stirring overnight and diafiltered to a conductivity of under 10 mS/cm to remove excess water and unreacted materials. The diafiltration process typically required an addition of about 500 ml of distilled water. Particle size-frequency analysis by transmission electron micrography revealed a mean particle size of 2.8±0.9 nm, with size frequency distribution having a coefficient of variation, COV, (one standard deviation divided by the mean diameter) of 32%. Alternatively, after several months of storage at room temperature, a particle size analysis of the clear yellow orange dispersion by dynamic light scattering indicated a hydrodynamic diameter of about 15 nm.

Example 14f

Preparation of $Ce_{0.045}Fe_{0.955}O_{2-\delta}$ (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 65° C. with constant bar stirring. A metal salt solution containing 0.376 grams of cerium (III) nitrate hexahydrate and 7.34 grams of iron (III) nitrate nonahydrate, 98% $Fe(NO_3)_3.9H_2O$, dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 0.376 grams of cerium (III) nitrate hexahydrate and 7.34 grams of iron (III) nitrate nonahydrate, 98% $Fe(NO_3)_3.9H_2O$, dissolved in 10 ml of distilled water (total solution volume 10-11 ml) was added at a rate of 3 ml/minute concurrently with the remaining half of the hydrogen peroxide. The molar ratio of methoxyacetic acid stabilizer to total metals was 2.32. When all reagents had been added, the reaction mixture was an opaque dark orange brownish color at about a pH of 5. The reaction mixture was then heated for an additional 60 minutes at 65° C. degrees, during which time the pH dropped to 3.9, and the mixture became a slightly turbid orange brown color. The reaction mixture was cooled with stirring overnight. After standing unstirred for several hours, a small amount of a tan colored sediment appeared, above which the solution remained a clear deep brown color. Particle size analysis of the clear deep brown supernatant by dynamic light scattering indicated a hydrodynamic diameter of about 21 nm.

Example 15

Preparation of Iron Oxides (Comparative)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 65° C. with constant bar stirring. A metal salt solution containing 7.35 grams of iron (III) nitrate nonahydrate, 98% $Fe(NO_3)_3 \cdot 9H_2O$, dissolved in 10 grams distilled water (total solution volume of 10-11 ml), was drawn into a syringe pump and then subsequently pumped at a rate of 3 ml/minute into the MAA containing flask. Concurrent with the start of the iron salt solution addition, an aliquot of about 10 ml of concentrated (28-30%) ammonium hydroxide was pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 7.35 grams of iron (III) nitrate nonahydrate, 98% $Fe(NO_3)_3 \cdot 9H_2O$, dissolved in 10 ml of distilled water (total solution volume 10-11 ml) was added at a rate of 3 ml/minute concurrently with the remaining half of the hydrogen peroxide. When all reagents had been added, the reaction mixture was a turbid orange brown color. The reaction mixture was then heated for an additional 60 minutes at 65° C. degrees. The reaction mixture was cooled, and after standing unstirred for several hours, a light brown sediment occupied the bottom third of the reaction vessel, while the top portion was a slightly turbid deep brown color. The molar ratio of methoxyacetic acid stabilizer to total metals was 2.43.

Particle size analysis of the slightly turbid deep brown supernatant by dynamic light scattering indicated a hydrodynamic diameter of about 28 nm. Particle size analysis of a dispersion of the light brown sediment by dynamic light scattering indicated a hydrodynamic diameter of about 176 nm. These results are substantially similar to those obtained above in Example 8, wherein iron oxides were prepared using the Method 1 procedures of Example 4.

Samples of the materials prepared as described above in Examples 13 and 14a-14e were evaluated for OSC and rate by the procedures described above. Results are contained in Table 6 below.

TABLE 6

| Ex. | Composition (Method 3) | OSC ($\mu mole O_2/g$) | Rate Constant $\times 10^3$ (min$^{-1}$) | Comment |
|---|---|---|---|---|
| 13 | $CeO_2$ | 215.4 | 6.0 | Inventive |
| 14a | $Ce_{0.6}Fe_{0.4}O_{2-\delta}$ | 4651.7 | 21.5 | Inventive |
| 14b | $Ce_{0.4}Fe_{0.6}O_{2-\delta}$ | 5588.3 | 21.2 | Inventive |
| 14c | $Ce_{0.3}Fe_{0.7}O_{2-\delta}$ | 6436.8 | 11.0 | Inventive |
| 14d | $Ce_{0.2}Fe_{0.8}O_{2-\delta}$ | 7528.1 | 21.2 | Inventive |
| 14e | $Ce_{0.1}Fe_{0.9}O_{2-\delta}$ | 7999.0 | 20.4 | Inventive |

Comparison of the results for Example 13 to those of Examples 14a-14e shows a dramatic increase in both OSC and rate when 40-95.5% of the cerium is replaced by iron in nanoparticles prepared using homogeneous doping Method 3, hydrogen peroxide oxidant, and a molar ratio of methoxyacetic acid stabilizer to total metals of about 2.55.

Example 16

$Ce_{0.35}Zr_{0.15}Fe_{0.50}O_{2-\delta}$: Approaching the Minimum Cerium Concentration at Which a Ceria Cubic XRD Lattice Pattern was Observed. [CeO-324b]

Figure 7B:
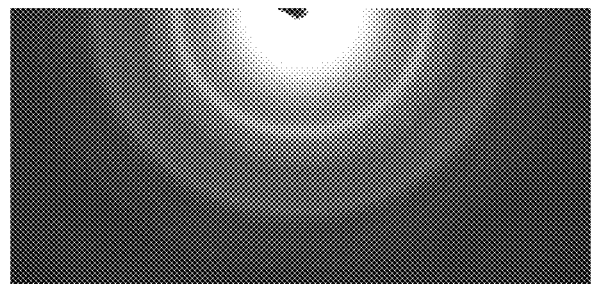
FIG. 7B is an electron diffraction pattern of $Ce_{0.35}Zr_{0.5}Fe_{0.50}O_{2-\delta}$, prepared as described in Example 17.
Figure 7A:
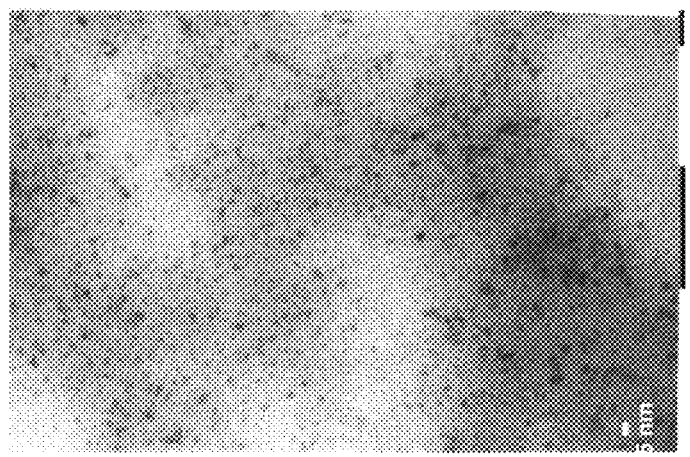
FIG. 7A is a high resolution TEM image of the nanoparticles of homogeneously prepared $Ce_{0.35}Zr_{0.15}Fe_{0.50}O_{2-\delta}$, prepared as described in Example 17.

Example 16 was prepared according to the homogeneous doping procedures of Method 1 as described in Example 4, except that an appropriate amount of zirconyl nitrate hydrate was added along with the cerium and iron salts such that a nominal composition of $Ce_{0.35}Zr_{0.15}Fe_{0.50}O_{2-\delta}$ was produced. FIG. 7A shows a high resolution TEM image of the nanoparticles of homogeneously prepared $Ce_{0.35}Zr_{0.15}Fe_{0.50}O_{2-\delta}$. FIG. 7B shows an electron diffraction pattern of $Ce_{0.35}Zr_{0.15}Fe_{0.50}O_{2-\delta}$, in which are seen the characteristic Bragg reflections of the cubic fluorite $CeO_2$ structure, thereby demonstrating the crystalline nature of the homogeneously prepared $Ce_{0.35}Zr_{0.15}Fe_{0.50}O_{2-\delta}$ nanoparticulate material.

Figure 7C:
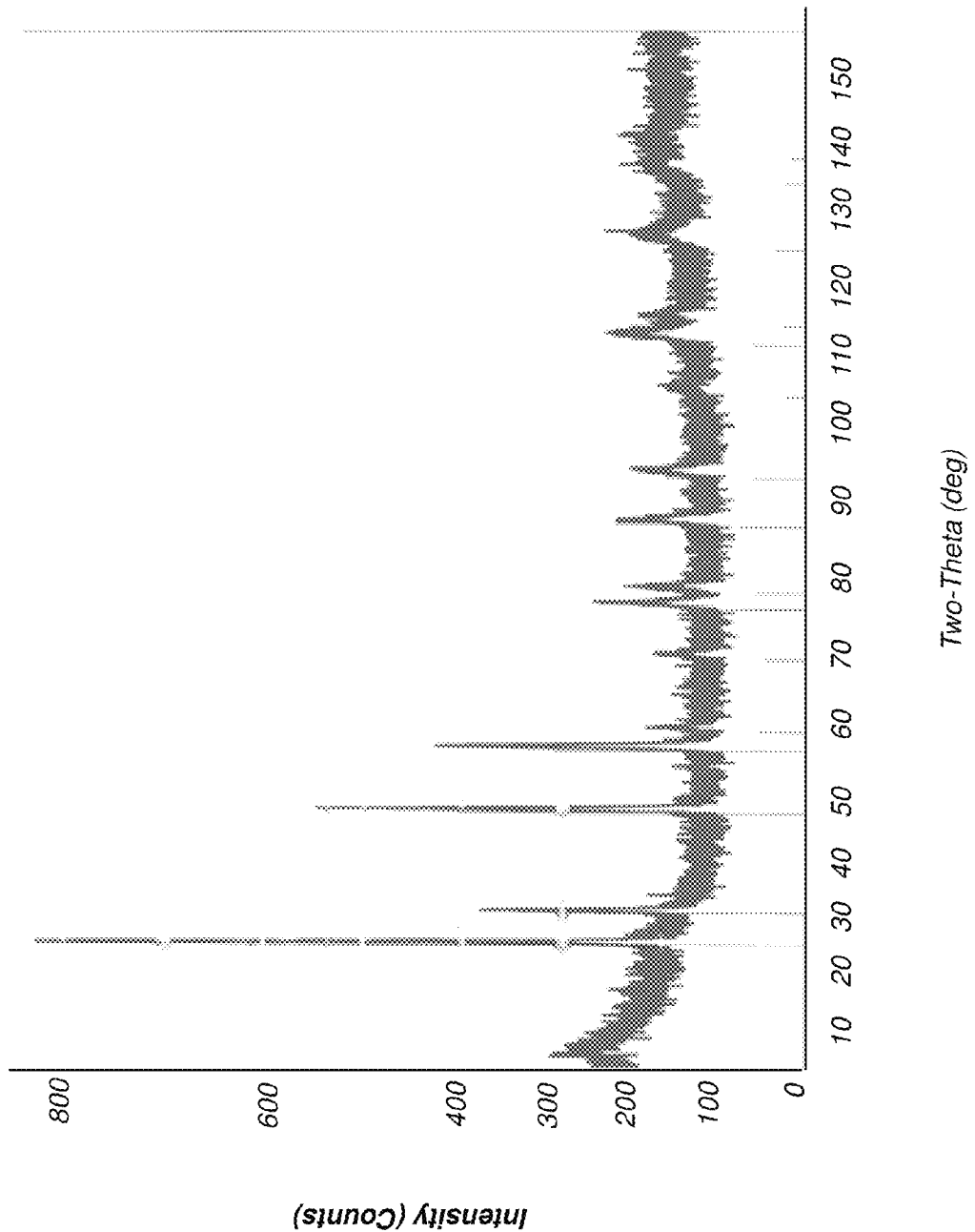
FIG. 7C is a powder x-ray diffraction pattern of homogeneously prepared $Ce_{0.35}Zr_{0.15}Fe_{0.50}O_{2-\delta}$, prepared as described in Example 17, superimposed on pure $CeO_2$ (line spectrum).

FIG. 7C shows the powder x-ray diffraction pattern of homogeneously prepared $Ce_{0.35}Zr_{0.15}Fe_{0.50}O_{2-\delta}$ superimposed on pure $CeO_2$ (line structure). A small contraction of the ceria lattice spacing, consistent with incorporation of either of the smaller ionic radii $Zr^{4+}$ or $Fe^{3+}$ ions, is indicated by the shift to higher 2θ for a majority of the peak positions.

Example 17

Preparation of Homogeneously Doped Cerium Dioxide $Ce_{0.6}Fe_{0.40}O_{2-\delta}$ To a 11 liter round bottom Type-316 stainless steel kettle or reactor with 3 mixing baffles, was added 1144 grams of distilled water (Kettle Water), which was maintained at 70° C. Using an impeller, the water was stirred at sufficient speed to provide good mixing. Then 292.1 grams of 98% methoxyacetic acid was added to the reactor. Two solution introduction jets directed to the impeller blades were put into the reactor and secured. An ammonium hydroxide solution (346.6 ml of 28-30% $NH_4OH$) was pumped through one jet at a rate of 69.3 ml/minute. A cerium-iron containing solution (334.5 gram of $Ce(NO_3)_3 \cdot 6H_2O$ and 207.5 gram of $Fe(NO_3)_3 \cdot 9H_2O$ with distilled water to make 625 ml) was pumped through the other jet at a delivery rate of 125 ml/minute. The cerium-iron solution and the ammonium hydroxide solution each required about 5 minutes to be delivered to the reactor. The ammonium hydroxide pump was stopped when the pH in the reactor reached about 4.5. The cerium-iron solution was purged from the delivery line with a 15 ml distilled water chase. Then 93.8 gram of a 50% $H_2O_2$ solution was pumped into the reactor at 9.38 ml/minute using a third jet and was followed by a brief distilled water flush. For the first one-half of the peroxide addition the pH was maintained at 4.5 and then allowed to drift downward freely for the remainder of the peroxide addition. The reaction mixture was held at 70° C. for an additional 60 minutes after which time it was cooled to 20 C. The reaction was filtered and concentrated via diafiltration (5000 Dalton filter) using 18 megaohm deionized water to a final concentration of 5 mS/cm.

The reaction as described above employed a molar ratio of methoxyacetic acid stabilizer to total metals of 2.48. TEM grain sizing revealed a particle size of 2.5±0.5 nm that had a distinct $CeO_2$ cubic fluorite electron diffraction pattern. This material was nanocrystalline and had a OSC of 4601.2 micromoles $O_2$/g and a rate constant of $15.6 \times 10^{-3}$ $min^{-1}$.

Example 18

Preparation of Fuel Additive Concentrates

The procedures of Example 17 were repeated at a 16× larger scale with similar results. After diafiltration and concentration, the dispersion of stabilized cerium and iron containing nanoparticles was solvent shifted by diafiltration procedures previously described in general in U.S. patent application Ser. No. 12/549,776, PROCESS FOR SOLVENT SHIFTING A NANOPARTICLE DISPERSION; such that a stable dispersion containing less than about 5% water and about 8% by weight of the stabilized nanoparticles in a 1:1 by volume mixture of diethylene glycol monomethyl ether and 1-methoxy-2-propanol was produced. A portion of the solvent shifted dispersion was combined with a 1:2 by volume mixture of oleic acid surfactant and kerosene diluent, such that a stable dispersion containing about 2% by weight of the stabilized nanoparticles was produced.

Example 19

Preparation of Additivized Diesel Fuel Containing Fuel Additive

Additivized diesel fuel containing about 5 parts per million (ppm) of the stabilized cerium and iron containing nanoparticles was prepared by adding 1 part of the fuel additive concentrate prepared in Example 18 to about 4000 parts of diesel fuel.

Example 20

Pushboat Evaluation of Additivized Diesel Fuel

The additivized diesel fuel prepared as described in Example 19 was evaluated in a Cummins KTA1150 inline 6-cylinder 4-cycle turbocharged engine with a displacement of 19 L and rated power of 500 HP, using test methodology adapted, in part, from SAE J1321 (1986-10) JOINT TMC/SAE FUEL COMSUMPTION TEST PROCEDURE—TYPE II, which is directed specifically toward comparison of fuels by testing in truck engines. The test engine was one of two identical propulsion engines onboard a commercial pushboat that is used to push barges filled with commodities such as grain, stone, coal, etc., along commercial shipping waterways. Each engine was supplied with fuel from its own dedicated fuel tank. During the Baseline Segment, both engines were supplied with untreated fuel. During the Test Segment, the supply of fuel to one engine (Treat Engine (T)) was treated with the additive, while the supply of fuel to the other engine (Control Engine (C)) remained untreated diesel fuel. This methodology allowed for one engine to remain untreated and be used as a control to detect and compensate for any environmental factors which could not be controlled throughout the evaluation.

Each engine was instrumented with its own Sensors Inc. (Saline, Mich., USA) SEMTECH-DS Portable Emissions Measurement System (PEMS) that measured exhaust emissions of $CO_2$, CO, $NO_2$, NO, and THC; from which fuel consumption was calculated using a carbon balance analysis method. Each PEMS continuously measured exhaust emissions and fuel consumption at 1 Hz sampling. The operation of the Control Engine and its PEMS analyzer was completely independent from the Treat Engine operation and its PEMS analyzer.

Each Test Run consisted of running both engines simultaneously at a fixed RPM either with the pushboat stationary against a dock or on a fixed route on an inland waterway which had no tide or current. Prior to each Test Run, the engines were warmed up for at least two hours, and then the Test Run began with the PEMS recording gas emissions and fuel measurements of both engines simultaneously under the steady state 1400 RPM load for approximately 20 minutes.

Test Runs were conducted on the engines before any additized fuel was used to establish baseline performance of both the Control and Treat engines; these runs comprised the Baseline Segment. Test Runs were then repeated after the Treat engine's fuel had been additized such that the concentration of the active doped cerium dioxide species (e.g. cerium and iron containing nanoparticles) was 5 ppm by weight in the diesel fuel. The Control engine's fuel remained untreated. Test Runs during which the Treat engine's fuel was additized comprised the Test Segment.

For each Test Run, T/C Ratios were calculated for fuel consumption and each gas species emission. A T/C Ratio is the ratio of the measured value of a PEMS parameter—such as fuel consumption—for the Treat Engine (T) to the measured value of the same parameter for the Control Engine (C) for that Test Run. T/C Ratios establish the relative performance of the Treat Engine to the Control Engine and incorporate the Control Engine's role of compensating for environmental factors which affected both engines. For each PEMS parameter, the T/C Ratio for each Test Run during the Test Segment was compared to the average T/C Ratio for that parameter during the Baseline Segment. The percent difference in a PEMS parameter's Test Segment T/C Ratio versus its average Baseline Segment T/C Ratio represents the effect the diesel fuel additive had on the Treat Engine's performance for that PEMS parameter. An improvement (reduction) in a PEMS parameter such as fuel consumption or a gas species emission is represented as a negative value. Table 7 below contains the pushboat fuel consumption results for various Test Runs during the Treat Segment (after additivization), expressed as a percent change from the Baseline Segment level.

TABLE 7

| Hours After Treatment | Percent Change in Fuel Consumption | Percent Change in NO Gas Emission |
| --- | --- | --- |
| 86 | −2.0 | 0.1 |
| 94 | −8.8 | −14.1 |
| 120 | −9.2 | −13.7 |
| 136 | −8.1 | −16.0 |

The results shown in Table 7 indicate that after 86 hours of engine operation during the Treat Segment, the Treat Engine began to show a significant improvement (reduction) in fuel consumption. Thereafter, during the Test Runs following 94-136 hours of engine operation, the Treat Engine displayed an 8-9% improvement (reduction) in fuel consumption and a 14-16% reduction in nitric oxide (NO) gas emission as a result of the addition of 5 ppm of the cerium and iron containing nanoparticles in the diesel fuel.

Example 21

Preparation of Homogeneously Doped Cerium Dioxide $Ce_{0.45}Zr_{0.15}Fe_{0.40}O_{2-\delta}$ The procedures of Example 17 were repeated, except that the temperature of the reaction was increased to 85° C., and the amounts of metal ion salts employed was as follows: 250.9 grams of $Ce(NO_3)_3 \cdot 6H_2O$, 65.35 grams of zirconyl nitrate hydrate 207.5 and 207.5 grams of $Fe(NO_3)_3 \cdot 9H_2O$. Thus a molar metal ions composition of 45% cerium, 15% zirconium and 40% iron was used.

The reaction as described above employed an oxidant, 94.9 gram of a 50% $H_2O_2$ solution, and a molar ratio of methoxy-acetic acid stabilizer to total metals of 2.31. This material had a OSC of 4723 micromoles $O_2/g$ and a rate constant of $9.6 \times 10^{-3}$ min$^{-1}$.

Example 22

Preparation of Fuel Additive Concentrate

After diafiltration and concentration, the dispersion of stabilized cerium, zirconium and iron containing nanoparticles prepared as described in Example 21 was solvent shifted by diafiltration procedures described in Example 18, such that a stable dispersion of the stabilized nanoparticles in a 1:1 by volume mixture of diethylene glycol monomethyl ether and 1-methoxy-2-propanol, which contained less than about 5% water, was produced. A portion of the solvent shifted dispersion was combined with oleic acid surfactant, and then combined with kerosene diluent, such that the volume ratio of oleic acid to kerosene used was 1:2. The resulting fuel additive concentrate was a stable dispersion containing about 2% by weight of the stabilized cerium, zirconium and iron containing nanoparticles.

Example 23

Preparation of Additivized Diesel Fuel

Additivized diesel fuel containing about 5 parts per million (ppm) of the stabilized cerium, zirconium and iron containing nanoparticles was prepared by adding 1 part of the fuel additive concentrate prepared in Example 22 to about 4000 parts of diesel fuel.

Example 24

Pushboat Evaluation of Additivized Diesel Fuel

The additivized diesel fuel prepared as described in Example 23 was evaluated in a Detroit Diesel 671 inline 6-cylinder 2-cycle Roots blower fed engine with a displacement of 7 L and rated power of 238 HP, using test methodology adapted, in part, from SAE J1321 (1986-10) JOINT TMC/SAE FUEL COMSUMPTION TEST PROCEDURE—TYPE II, as described above in Example 20. Once more, the test engine was one of two identical propulsion engines onboard a commercial pushboat that is used to push barges filled with commodities such as grain, stone, coal, etc., along commercial shipping waterways. Each engine was supplied with fuel from its own dedicated fuel tank.

Table 8 contains the pushboat fuel consumption results for various Test Runs during the Treat Segment (after additivization), expressed as a percent change from the Baseline Segment level.

TABLE 8

| Hours After Treatment | Percent Change in Fuel Consumption | Percent Change in NO Gas Emission |
| --- | --- | --- |
| 3 | −3.0 | −4.0 |
| 24 | −5.0 | −7.0 |
| 48 | −8.0 | −11.0 |
| 72 | −7.0 | −11.0 |
| 96 | −7.0 | −5.0 |

The results indicate that after 3 hours and 24 hours of engine operation during the Treat Segment, the Treat Engine began to show improvements (reductions) in fuel consumption of 3.0% and 5.0%, respectively. Thereafter, during the Test Runs following 48-96 hours of engine operation, the Treat Engine displayed a 7-8% improvement (reduction) in fuel consumption. Similar improvements were also observed for reduction in nitric oxide (NO) gas emission. After 3 hours and 24 hours of engine operation during the Treat Segment, the Treat Engine showed 4% and a 7.0% reduction in NO gas emission, respectively. Following 48-72 hours of engine operation, the Treat Engine displayed an 11% improvement (reduction) in NO gas emission as a result of the addition of 5 ppm of the cerium, zirconium and iron containing nanoparticles in the diesel fuel.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed:

1. A method for making a dispersion of cerium oxide nanoparticles that include at least one other metal, comprising:
    a) forming an aqueous reaction mixture comprising:
        i) a source of cerous ion and a source of one or more metal ions other than cerium, wherein said source of cerous ion and said source of one or more metal ions other than cerium are introduced into the reaction mixture concurrently;
        ii) a source of hydroxide ion;
        iii) at least one monoether carboxylic acid, wherein the molar ratio of said monoether carboxylic acid to total metal ions is greater than 0.2; and
        iv) an oxidant at an initial temperature in the range of about 20° C. to about 100° C.;
    b) maintaining the reaction mixture at a temperature permitting oxidation of cerous ion to ceric ion; and
    c) thereby forming in the reaction mixture a dispersion of metal-containing cerium oxide nanoparticles, $Ce_{1-x}M_xO_{2-\delta}$, wherein x has a value from about 0.001 to about 0.95; M represents said at least one other metal, and δ has a value of about 0.0 to about 0.5.

2. The method of claim 1, wherein the nanoparticles have a mean hydrodynamic diameter of about 1 nm to about 50 nm.

3. The method of claim 1, wherein the nanoparticles have a mean hydrodynamic diameter of 1.5 to 8 nm.

4. The method of claim 1, wherein the nanoparticles have a mean hydrodynamic diameter of 2 to 4 nm.

5. The method of claim 1, wherein said other metal is selected from the group consisting of transition metals, rare earth metals, and combinations thereof.

6. The method of claim 1, wherein said other metal is selected from the group consisting of iron, zirconium, and combinations thereof.

7. The method of claim 1, wherein x has a value of about 0.30 to 0.60.

8. The method of claim 1, wherein said source of cerous ion is cerous nitrate.

9. The method of claim 1, wherein said monoether carboxylic acid is selected from the group consisting of ethoxyacetic acid, methoxyacetic acid, 3-methoxypropionic acid, and combinations thereof.

10. The method of claim 9, wherein said monoether carboxylic acid is methoxyacetic acid.

11. The method of claim 1, wherein said oxidant is hydrogen peroxide.

12. The method of claim 1, wherein the molar ratio of monoether carboxylic acid to total metal ions is greater than 0.3.

13. The method of claim 1, wherein the molar ratio of monoether carboxylic acid to total metal ions is greater than 0.6.

14. The method of claim 1, wherein the pH of the reaction mixture is less than or equal to 7.

15. The method of claim 1, wherein the pH of the reaction mixture is less than or equal to 5.

16. The method of claim 1, further comprising adding the metal-containing cerium oxide nanoparticles to diesel fuel as a fuel additive.

17. The method of claim 1, wherein said nanoparticles are characterized by a crystalline cubic fluorite structure.

* * * * *